United States Patent
Kim et al.

(10) Patent No.: US 12,421,349 B2
(45) Date of Patent: Sep. 23, 2025

(54) POLYPHENYLENE ETHER COMPOSITION

(71) Applicant: ASAHI KASEI KABUSHIKI KAISHA, Tokyo (JP)

(72) Inventors: Jaehoon Kim, Tokyo (JP); Shinichi Fukuen, Tokyo (JP); Hiroshi Fukuoka, Tokyo (JP); Shoji Otani, Tokyo (JP); Ryoko Fukuoka, Tokyo (JP); Noko Honda, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 809 days.

(21) Appl. No.: 17/754,439

(22) PCT Filed: Aug. 28, 2020

(86) PCT No.: PCT/JP2020/032709
§ 371 (c)(1),
(2) Date: Apr. 1, 2022

(87) PCT Pub. No.: WO2021/065275
PCT Pub. Date: Apr. 8, 2021

(65) Prior Publication Data
US 2022/0356302 A1 Nov. 10, 2022

(30) Foreign Application Priority Data

Oct. 2, 2019 (JP) .................. 2019-182436
Oct. 2, 2019 (JP) .................. 2019-182437

(51) Int. Cl.
*C08G 65/48* (2006.01)
*C08G 65/44* (2006.01)
*C08L 71/12* (2006.01)

(52) U.S. Cl.
CPC ............. *C08G 65/44* (2013.01); *C08G 65/48* (2013.01); *C08G 65/485* (2013.01); *C08L 71/126* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 3,496,236 A | 2/1970 | Cooper et al. | |
| 3,843,599 A * | 10/1974 | Brindell | C08L 7/00 524/925 |
| 4,309,513 A * | 1/1982 | Ueno | C08L 71/123 525/92 D |
| 9,012,572 B2 | 4/2015 | Lin et al. | |
| 11,548,981 B2 * | 1/2023 | Fukuoka | C08G 65/48 |
| 2007/0129502 A1 | 6/2007 | Kawabe et al. | |
| 2007/0213499 A1 | 9/2007 | Uera et al. | |
| 2008/0051522 A1 | 2/2008 | Birsak et al. | |
| 2008/0171817 A1 | 7/2008 | Peters et al. | |
| 2009/0018303 A1 | 1/2009 | Onizuka et al. | |
| 2011/0065889 A1 | 3/2011 | Ihata | |
| 2014/0323666 A1 | 10/2014 | Lin et al. | |
| 2016/0102174 A1 | 4/2016 | Avakian | |
| 2019/0345324 A1 | 11/2019 | Tarkin-Tas et al. | |
| 2021/0024695 A1 | 1/2021 | Fukuoka et al. | |

FOREIGN PATENT DOCUMENTS

| | | |
|---|---|---|
| CN | 102037055 A | 4/2011 |
| CN | 105518055 A | 4/2016 |
| JP | S59174623 A | 10/1984 |
| JP | 2004099824 A | 4/2004 |
| JP | 2004256717 A | 9/2004 |
| JP | 2004339328 A | 12/2004 |
| JP | 2007070598 A | 3/2007 |
| JP | 2007308685 A | 11/2007 |

(Continued)

OTHER PUBLICATIONS

Apr. 5, 2022, International Preliminary Report on Patentability issued in the International Patent Application No. PCT/JP2020/032709.

(Continued)

*Primary Examiner* — David J Buttner
(74) *Attorney, Agent, or Firm* — KENJA IP LAW PC

(57) ABSTRACT

The present disclosure provides a polyphenylene ether composition having a high glass transition temperature and a long-term solubility in a solvent, and exhibiting a low viscosity when being dissolved in a solvent. The polyphenylene ether composition of the present disclosure contains 60 mol % or more of a polyphenylene ether having the structure of Formula (1),

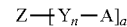

wherein the ratio of the integrated value of the peak appearing at 7.6 to 8.3 ppm to the integrated value of the peak derived from the structure of the following Formula (2)

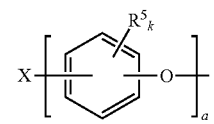

in a $^1$H-NMR measurement result is 1 or less, and the number average molecular weight in terms of polystyrene is 500 to 15,000 g/mol.

12 Claims, No Drawings

(56) References Cited

FOREIGN PATENT DOCUMENTS

| | | |
|---|---|---|
| JP | 2010503754 A | 2/2010 |
| JP | 5147397 B2 | 2/2013 |
| JP | 5176336 B2 | 4/2013 |
| JP | 2014005468 A | 1/2014 |
| JP | 5439700 B2 | 3/2014 |
| JP | 2019023263 A | 2/2019 |
| JP | 2019172914 A | 10/2019 |
| WO | 2005073264 A1 | 8/2005 |
| WO | 2007097231 A1 | 8/2007 |
| WO | 2019189829 A1 | 10/2019 |

OTHER PUBLICATIONS

Nov. 10, 2020, International Search Report issued in the International Patent Application No. PCT/JP2020/032709.

Nov. 9, 2022, the Supplementary European Search Report issued by the European Patent Office in the corresponding European Patent Application No. 20871584.7.

* cited by examiner

POLYPHENYLENE ETHER COMPOSITION

TECHNICAL FIELD

The present disclosure relates to a polyphenylene ether composition.

BACKGROUND

Polyphenylene ethers are excellent in high-frequency characteristics, flame retardancy, and heat resistance, and they are therefore widely used as materials in electric and electronic fields, automotive fields, and other industrial material fields. Recently, polyphenylene ethers having extremely low molecular weights are expected to be more effective for electronic material applications such as substrate materials than generally-used high molecular weight polyphenylene ethers. Hence, PTL 1 proposes a low molecular weight polyphenylene ether having a lower dielectric constant than generally-used high molecular weight polyphenylene ethers which is produced from 2,6-dimethylphenol as the raw material, and an efficient production method of the same.

In the meantime, when a polyphenylene ether is used as a molding material such as a substrate material, not only an excellent dielectric characteristic but also excellent heat resistance, formability, and the like are required. However, conventional polyphenylene ether is thermoplastic, and sufficient heat resistance cannot be obtained in some cases. For this reason, various methods have been proposed, such as using a material obtained by adding a thermosetting resin such as an epoxy resin to a polyphenylene ether, and using a modified polyphenylene ether.

PTL 2 discloses a modified polyphenylene ether compound having a predetermined polyphenylene ether moiety in the molecular structure and having at least one or more p-ethenylbenzyl group, m-ethenylbenzyl group, and the like at a molecular terminal thereof.

Further, PTL 3 discloses a modified polymer having a polyphenylene ether moiety in the molecular structure, and having a methacrylic group at a molecular terminal thereof.

For easily assuring a heat resistance of a terminally modified thermosetting polyphenylene ether as in the compounds disclosed in PTL 2 and PTL 3, a method of increasing the crosslinking density between a thermosetting polyphenylene ether and a thermosetting crosslinking agent is effective. To achieve this, a polyfunctional polyphenylene ether having a plurality of terminals in one molecule is required. Hence, PTLs 4, 5, and 6 propose low molecular weight polyfunctional polyphenylene ethers obtained through polymerization in the presence of a polyfunctional phenolic compounds. Because such polyfunctional polyphenylene ethers have branched structures, they have lower solution viscosities than linear polymers having the same molecular weight, and have higher fluidity than those of linear polymers having the same molecular weight. Thus, a polymer having a relatively high molecular weight can be used in the curing step, and improvement in physical properties of a cured product can be expected. Further, in addition to the above contribution to an improvement in the physical properties, improved control on a crosslinking reaction can be expected because the numbers of crosslinking reaction sites is increased.

CITATION LIST

Patent Literature

PTL 1: JP 2004-99824 A
PTL 2: JP 2004-339328 A
PTL 3: JP 5147397 B
PTL 4: U.S. Pat. No. 9,012,572 B
PTL 5: JP 5176336 B
PTL 6: JP 5439700 B

SUMMARY

Technical Problem

A method of manufacturing a substrate material for high frequency applications includes a step of impregnating a supporting material such as glass cloth with a varnish in which a low dielectric polymer material is dissolved, followed by thermosetting. In order to use a polyfunctional polyphenylene ether composition in this step, various physical properties need to be assured.

For example, for performing the thermosetting step, a polyfunctional polyphenylene ether composition needs to have a glass transition temperature equal to or higher than the thermosetting temperature for assuring heat resistance of a cured product. In addition, in order to prepare and store a varnish for evenly impregnating a supporting material such as glass cloth, long-term dissolution in a solvent such as methyl ethyl ketone used in a varnish is required. Further, the varnish needs to have a low liquid viscosity for improving the workability during application to a substrate material, particularly the impregnation property to a supporting material such as glass cloth.

The present disclosure is made in view of the problem described above and it is an object thereof to provide a polyphenylene ether composition having a high glass transition temperature and a long-term solubility in a solvent, and exhibiting a low viscosity when being dissolved in a solvent.

Solution to Problem

The present disclosure are hence as follows.
[1] A polyphenylene ether composition comprising:
  60 mol % or more of a polyphenylene ether having a structure of the following Formula (1),
    wherein a ratio of an integrated value of a peak appearing at 7.6 to 8.3 ppm to an integrated value of a peak derived from a structure of the following Formula (2) is 1 or less in a $^1$H-NMR measurement result, and
  a number average molecular weight in terms of polystyrene is 500 to 15000 g/mol,

Formula (1)

(in Formula (1), Z is an a-valent partial structure represented by the following Formula (2), a represents an integer of 2 to 6, Y are each independently a divalent linking group having a structure of the following Formula (4), n represents a repeating number of Y and are each independently an integer of 0 to 200, and at least one n in a (—$Y_n$—H) is an integer of 1 or more,

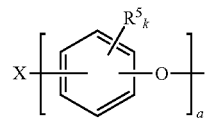

Formula (2)

in Formula (2), X is an optional a-valent linking group, $R^5$ are each independently an optional substituent, k are each independently an integer of 1 to 4, and at least one $R^5$ is a partial structure represented by the following Formula (3),

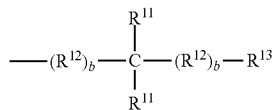

Formula (3)

in Formula (3), $R^{11}$ are each independently an optionally substituted alkyl group having a carbon number of 1 to 8, $R^{12}$ are each independently an optionally substituted alkylene group having a carbon number of 1 to 8, b are each independently 0 or 1, and $R^{13}$ represents one of a hydrogen atom, an optionally substituted alkyl group having a carbon number of 1 to 8, and an optionally substituted phenyl group, when the position of the carbon atom of the benzene ring to which —O— is bonded in Formula (2) is designated as Position 1, $R^5$ having the partial structure of Formula (3) is bonded to one carbon atom at Position 2 or Position 6, and a hydrogen atom, a methyl group, or an ethyl group is bonded to the other carbon atom at Position 2 or Position 6, and

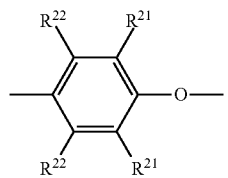

Formula (4)

in Formula (4), $R^{21}$ are each independently one of a hydrogen atom, an optionally substituted hydrocarbon group having a carbon number of 1 to 6, an optionally substituted aryl group having a carbon number of 6 to 12, and a halogen atom, and two $R^{21}$ cannot be both hydrogen atoms, and two $R^{21}$ are not in a combination in which one $R^{21}$ is the partial structure represented by the above Formula (3) and the other $R^{21}$ is one of a hydrogen atom, a methyl group, or an ethyl group, and $R^{22}$ are each independently one of a hydrogen atom, an optionally substituted hydrocarbon group having a carbon number of 1 to 6, an optionally substituted aryl group having a carbon number of 6 to 12, and a halogen atom.)

[2] The polyphenylene ether composition according to [1], wherein the partial structure represented by Formula (3) is a t-butyl group.

[3] The polyphenylene ether composition according to [1] or [2], wherein a number of OH terminals contained in the polyphenylene ether composition is 1000 to 3000 μmol/g.

[4] A polyphenylene ether composition comprising:
a modified polyphenylene ether having a structure of the following Formula (1)',
wherein the modified polyphenylene ether having the structure of the following Formula (1)', a modified polyphenylene ether in which one or more (—$Y_n$-A) are (—$Y_n$—H) and not all (—$Y_n$-A) are (—$Y_n$—H) in the structure of the following Formula (1)', and a polyphenylene ether in which all (—$Y_n$-A) are (—$Y_n$—H) in the structure of the following Formula (1)' are contained in an amount of 60 mol % or more in total, a ratio of an integrated value of a peak appearing at 7.6 to 8.3 ppm to an integrated value of a peak derived from the structure of the following Formula (2)' is 1 or less in a $^1$H-NMR measurement result, and a number average molecular weight in terms of polystyrene is 500 to 15000 g/mol,

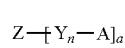

Formula (1)'

(in Formula (1)', Z is an a-valent partial structure represented by the following Formula (2)', a represents an integer of 2 to 6, A each independently represents a substituent containing a carbon-carbon double bond and/or an epoxy bond, Y are each independently a divalent linking group having a structure of the following Formula (4)', n represents a repeating number of Y and are each independently an integer of 0 to 200, and at least one n in a (—$Y_n$-A) is an integer of 1 or more,

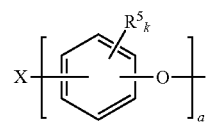

Formula (2)' in Formula (2)', X is an optional a-valent linking group, $R^5$ are each independently an optional substituent, k are each independently an integer of 1 to 4, and at least one $R^5$ is a partial structure represented by the following Formula (3)',

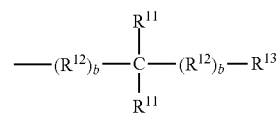

Formula (3)' in Formula (3)', $R^{11}$ are each independently an optionally substituted alkyl group having a carbon number of 1 to 8, $R^{12}$ are each independently an optionally substituted alkylene group having a carbon number of 1 to 8, b are each independently 0 or 1, and $R^{13}$ represents one of a hydrogen atom, an optionally substituted alkyl group having a carbon number of 1 to 8 or an optionally substituted phenyl group, when the position of the carbon atom of the benzene ring to which —O— is bonded in Formula (2)' is designated as Position 1, $R^5$ having the partial structure of Formula (3)' is bonded to one carbon atom at Position 2 or Position 6, and a hydrogen atom, a methyl group, or an ethyl group is bonded to the other carbon atom at Position 2 or Position 6, and

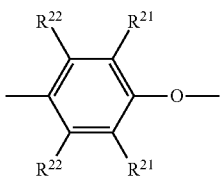

Formula (4)' in Formula (4)', $R^{21}$ are each independently one of a hydrogen atom, an optionally substituted hydrocarbon group having a carbon number of 1 to 6, an optionally substituted aryl group having a carbon number of 6 to 12, and a halogen atom, and two $R^{21}$ cannot be both hydrogen atoms, and two $R^{21}$ are not in a combination in which one $R^{21}$ is the partial structure represented by the above Formula (3)' and the other $R^{21}$ is one of a hydrogen atom, a methyl group, or an ethyl group, and $R^{22}$ are each independently one of a hydrogen atom, an optionally substituted hydrocarbon group having a carbon number of 1 to 6, an optionally substituted aryl group having a carbon number of 6 to 12, and a halogen atom.)

[5] The polyphenylene ether composition according to [4], wherein the partial structure represented by Formula (3)' is a t-butyl group.

[6] The polyphenylene ether according to [4] or [5], wherein A is a group represented by the following Formula (5)',

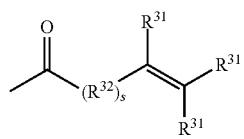

Formula (5)'

(in Formula (5)', $R^{31}$ are each independently a hydrogen atom, a hydroxy group or a hydrocarbon group having a carbon number of 1 to 30, an aryl group, an alkoxy group, an allyloxy group, an amino group, or a hydroxyalkyl groups, $R^{32}$ are each independently a hydrocarbon group having a carbon number of 1 to 30, and s is an integer between 0 and 5.)

[7] The polyphenylene ether composition according to any one of [4] to [6], wherein the number of A groups contained in the polyphenylene ether composition is from 700 to 3000 μmol/g.

Advantageous Effect

According to the present disclosure, a polyphenylene ether composition having a high glass transition temperature and a long-term solubility in a solvent, and exhibiting a low viscosity when being dissolved in a solvent is provided.

DETAILED DESCRIPTION

The following provides a detailed description of embodiments of this disclosure (hereinafter, referred to as the "present embodiments"). The present embodiments described below are provided as an illustrative example to facilitate explanation of the present disclosure. However, the present disclosure is not limited to the present embodiments and can be implemented with appropriate alterations within the essential scope thereof.

Note that, in the present specification, the expression "A (value) to B (value)" means A or more and B or less.

A polyphenylene ether composition according to the present embodiment contains 60 mol % or more of a polyphenylene ether having the structure represented by the following Formula (1), wherein the ratio of the integrated value of the peak appearing at 7.6 to 8.3 ppm to the integrated value of the peak derived from the structure represented by the following Formula (2) in a $^1$H-NMR measurement result is 1 or less, and the number average molecular weight in terms of polystyrene is 500 to 15000 g/mol. In the present specification, this polyphenylene ether composition is sometimes referred to as "polyfunctional polyphenylene ether composition".

Further, a polyphenylene ether composition according to the present embodiment includes a polyphenylene ether having a structure represented by the following Formula (1)'. This modified polyphenylene ether composition contains 60 mol % or more of a modified polyphenylene ether having a structure represented by the following Formula (1)' and a modified or unmodified polyphenylene ether in which at least one ($—Y_n$-A) is ($—Y_n$—H) in the structure represented by the following Formula (1)' in an amount of 60 mol %, wherein the ratio of the integrated value of the peak appearing at 7.6 to 8.3 ppm to the integrated value of the peak derived from the structure represented by the following Formula (2)' in a $^1$H-NMR measurement result is 1 or less, and the number average molecular weight in terms of polystyrene is 500 to 15000 g/mol. In the present specification, this polyphenylene ether composition is sometimes referred to as "polyfunctional modified polyphenylene ether composition" or "modified polyphenylene ether composition".

<Polyfunctional Polyphenylene Ether Composition>

The polyfunctional polyphenylene ether composition of the present embodiment may contain one or two or more polyphenylene ethers.

The polyfunctional polyphenylene ether composition of the present embodiment may further contain additives such as a solvent, a polymerization catalyst, and a surfactant. The polyfunctional polyphenylene ether composition of the present embodiment may be a solid.

(Polyphenylene Ether)

The above polyphenylene ether preferably has a structure represented by the following Formula (1).

Formula (1)

In Formula (1), a ($—Y_n$—H) bonded to Z may be the same or different. Z is an a-valent central phenol site represented by the following Formula (2). A is an integer of 2 to 6.

The central phenol site refers to the central skeleton serving as a starting point of a reaction upon polymerization of a polyfunctional polyphenylene ether, and the structure thereof can be identified by analyzing the polyfunctional polyphenylene ether composition by a technique such as NMR and mass spectrometry. Examples of a specific method for identifying the structure of the central phenol site from the polyfunctional polyphenylene ether composition include a method in which only low molecular weight components are analyzed from a result of mass spectrometry of the polyfunctional polyphenylene ether composition, and the structure of the central phenol site is estimated from peaks of fragment ions by EI. Alternatively, a method is exemplified in which the structure of the central phenol site is estimated by performing an NMR measurement of the polyfunctional polyphenylene ether composition and comparing it with NMR measurement results of known polyfunctional phenolic compounds. By combining a mass spectrometry result and an NMR measurement result, the structure of the central phenol site can be identified more accurately.

The above polyphenylene ether may have a structure in which a partial structures (e.g., phenols optionally substituted with $R^5$ or the like) are bonded to the a-valent central portion X, and ($-Y_n-H$) of Formula (1) is bonded to an a-valent partial structure (i.e., the central phenol site represented by Formula (2)).

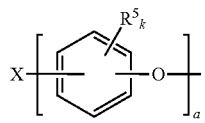

Formula (2)

(In Formula (2), a may be an integer similar to the corresponding integer in Formula (1), and is preferably the same integer as that in Formula (1). In the central phenol site in Formula (2), each of the a partial structures may have the same structure or different structures. Among them, it is preferable that each of the a partial structures has the same structure from the viewpoint of obtaining a polyphenylene ether composition having a further higher glass transition temperature and further excellent long-term solubility in a solvent and exhibiting a further lower viscosity when being dissolved in a solvent).

In Formula (2), X is an optional a-valent linking group, and examples thereof include, but are not particularly limited to, a hydrocarbon group such as a chain hydrocarbon and a cyclic hydrocarbon; a hydrocarbon group containing one or more atoms selected from nitrogen, phosphorus, silicon, and oxygen; an atom such as nitrogen, phosphorus, and silicon; and a combination of these. X may be a linking group excluding a single bond.

X may be a linking group connecting the a-valent partial structures to each other.

Examples of the above X include an a-valent alkyl skeleton bonded to the benzene ring to which $R^5$ is bonded, via a single bond, an ester bond, or the like, an a-valent aryl skeleton bonded to the benzene ring to which $R^5$ is bonded, via a single bond, an ester bond, or the like, and an a-valent heterocyclic skeleton bonded to the benzene ring to which $R^5$ is bonded, via a single bond, an ester bond, or the like.

Here, examples of the alkyl skeleton include, but are not particularly limited to, a skeleton in which branched terminals of a chain hydrocarbon (e.g., a chain saturated hydrocarbon) branched into at least a branches having a carbon number of 2 to 6 are directly bonded to the benzene ring of the partial structure (it is suffice that the benzene ring is bonded to the a branched terminals, and there may be a branched terminal not bonded to the benzene ring), for example. Examples of the aryl skeleton include, but are not particularly limited to, a skeleton in which a benzene ring, a mesitylene group, or a 2-hydroxy-5-methyl-1,3-phenylene group is bonded to the benzene ring to which $R^5$ is bonded, via a single bond or an alkyl chain, for example. Examples of the heterocyclic skeleton include, but are not particularly limited to, a skeleton in which a triazine ring is bonded to the benzene ring to which $R^5$ is bonded, via a single bond or an alkyl chain, for example.

In Formula (2), $R^5$ are each independently an optional substituent, and k are each independently an integer of 1 to 4.

Examples of the above $R^5$ include a linear alkyl group having a carbon number of 1 to 8 such as a methyl group, an ethyl group, and an n-propyl group, and a group having a partial structure of the following Formula (3), and at least one $R^5$ is preferably a partial structure of the following Formula (3).

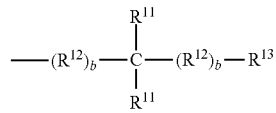

Formula (3)

In Formula (3), $R^{11}$ are each independently optionally substituted alkyl group having a carbon number of 1 to 8, $R^{12}$ are each independently optionally substituted alkylene group having a carbon number of 1 to 8, and b are each independently 0 or 1, and $R^{13}$ represents one of a hydrogen atom, an optionally substituted alkyl group having a carbon number of 1 to 8, and a phenyl group.

An example of the above substituent is a halogen atom.

The above Formula (3) is preferably a group containing secondary and/or tertiary carbon exemplified by an isopropyl group, an isobutyl group, a sec-butyl group, a tert-butyl group, a tert-amyl group, a 2,2-dimethylpropyl group, and a structure with a phenyl group at a terminal of any of these, and is more preferably a tert-butyl group.

In an a-valence partial structure of the above Formula (2), when the position of the carbon atom of the benzene ring to which —O— is bonded in Formula (2) is designated as Position 1, $R^5$ having the partial structure of Formula (3) is bonded to one carbon atom at Position 2 or Position 6, and a hydrogen atom, a methyl group, or an ethyl group is bonded to the other carbon atom at Position 2 or Position 6. A structure in which a hydrocarbon group or a partial structure of the above Formula (3) is bonded to a carbon atom at Position 2 or Position 6 may also be possible. In the benzene ring in the above Formula (2), ($Y_n-H$) in the above Formula (1) may be bonded to a carbon atom at a position other than Position 2 or Position 6 via the central portion X and an oxygen atom. Preferably, ($Y_n-H$) in the above Formula (1) is bonded to Position 1 via an oxygen atom, and the central portion X is bonded to Position 4.

In the above Formula (1), Y are each independently a bivalent linking group having a structure of the following Formula (4) (a phenol unit having a substituent), n represents a repeating number of Y and are each independently an integer of 0 to 200, and at least one n is an integer of 1 or more.

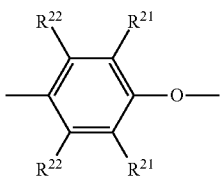

Formula (4)

In the above Formula (4), each $R^{21}$ independently represents a hydrogen atom; an optionally substituted hydrocarbon group having a carbon number of 1 to 6; an optionally substituted aryl group having a carbon number of 6 to 12; or a halogen atom; preferably a saturated or unsaturated hydrocarbon group having a carbon number of 1 to 6, more preferably a methyl group, an ethyl group, an n-propyl group, a vinyl group, an aryl group, an ethynyl group, or a propargyl group, more preferably a methyl group or an ethyl group, and particularly preferably a methyl group. In the above Formula (4), two $R^{21}$ cannot be both hydrogen atoms, and two $R^{21}$ are not in a combination in which one $R^{21}$ is the partial structure represented by the above Formula (3) and the other $R^{21}$ is one of a hydrogen atom, a methyl group, or an ethyl group.

$R^{22}$ each independently represents a hydrogen atom; an optionally substituted hydrocarbon group having a carbon number of 1 to 6; an optionally substituted aryl group having a carbon number of 6 to 12; or a halogen atom; preferably a hydrogen atom or an optionally substituted saturated or unsaturated hydrocarbon group having a carbon number of 1 to 6, more preferably a hydrogen atom, a methyl group, an ethyl group, or an n-propyl group, even more preferably a hydrogen atom or a methyl group, and particularly preferably a hydrogen atom.

An example of the above substituent is a halogen atom.

The above polyphenylene ether is obtained, for example, by copolymerizing a monohydric phenolic compound represented by the following Formula (5) and an a-hydric phenolic compound (central phenol) represented by the following Formula (6).

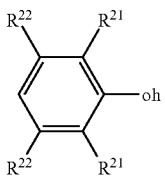

Formula (5)

(In the above Formula (5), $R^{21}$ and $R^{22}$ may be groups similar to the corresponding groups in the above Formula (4), and are preferably the same as the corresponding ones in the above Formula (4).

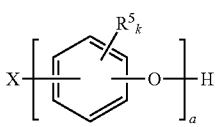

Formula (6)

(In the above Formula (6), X, $R^5$, and a may be similar to the corresponding ones in the above Formula (2), and are preferably the same as the corresponding ones in the above Formula (2). The a partial structures bonded to X may be the same or different, but are preferably the same).

Examples of the monohydric phenolic compound expressed by Formula (5) include o-cresol, 2,6-dimethylphenol, 2-ethylphenol, 2-methyl-6-ethylphenol, 2,6-diethylphenol, 2-n-propylphenol, 2-ethyl-6-n-propylphenol, 2-methyl-6-chlorophenol, 2-methyl-6-bromophenol, 2-methyl-6-n-propylphenol, 2-ethyl-6-bromophenol, 2-methyl-6-n-butylphenol, 2,6-di-n-propylphenol, 2-ethyl-6-chlorophenol, 2-methyl-6-phenylphenol, 2-phenylphenol, 2,6-diphenylphenol, 2,6-bis-(4-fluorophenyl)phenol, 2-methyl-6-tolylphenol, 2,6-ditolylphenol, 2,5-dimethylphenol, 2,3,6-trimethylphenol, 2,5-diethylphenol, 2-methyl-5-ethylphenol, 2-ethyl-5-methylphenol, 2-allyl-5-methylphenol, 2,5-diallylphenol, 2,3-diethyl-6-n-propylphenol, 2-methyl-5-chlorophenol, 2-methyl-5-bromophenol, 2-methyl-5-isopropylphenol, 2-methyl-5-n-propylphenol, 2-ethyl-5-bromophenol, 2-methyl-5-n-butylphenol, 2,5-di-n-propylphenol, 2-ethyl-5-chlorophenol, 2-methyl-5-phenylphenol, 2,5-diphenylphenol, 2,5-bis-(4-fiuorophenyl)phenol, 2-methyl-5-tolylphenol, 2,5-ditolylphenol, 2,6-dimethyl-3-allylphenol, 2,3,6-triallylphenol, 2,3,6-tributylphenol, 2,6-di-n-butyl-3-methylphenol, 2,6-dimethyl-3-n-butylphenol, and 2,6-dimethyl-3-t-butylphenol, for example.

Among these monohydric phenolic compounds, 2,6-dimethylphenol, 2,6-diethylphenol, 2,6-diphenylphenol, 2,3,6-trimethylphenol, and 2,5-dimethylphenol are preferable, and 2,6-dimethylphenol and 2,3,6-trimethylphenol are more preferable, particularly due to their low cost and availability.

One of these phenolic compounds may be used individually, or two or more of these phenolic compounds may be used in combination.

As the monohydric phenolic compounds, for example, a method in which a combination of 2,6-dimethylphenol and 2,6-diethylphenol is used, a method in which a combination of 2,6-dimethylphenol and 2,6-diphenylphenol is used, a method in which a combination of 2,3,6-trimethylphenol and 2,5-dimethylphenol is used, or a method in which a combination of 2,6-dimethylphenol and 2,3,6-trimethylphenol is used may be adopted. In this case, the mixture ratio of different types of the phenolic compound may be selected as appropriate.

The phenolic compound that is used may contain a small amount of m-cresol, p-cresol, 2,4-dimethylphenol, 2,4,6-trimethylphenol, or the like which may be contained as a by-product upon production.

An a-hydric phenolic compound such as one represented by Formula (6) can be produced in an industrially advantageous manner through reaction of a corresponding monohydric phenolic compound and an aldehyde (for example, formaldehyde), a ketone (for example, acetone, methyl ethyl ketone, methyl isobutyl ketone, acetophenone, or cyclohexanone), or a dihalogenated aliphatic hydrocarbon, or through reaction of corresponding monohydric phenolic compounds with one another.

Examples of the polyhydric phenolic compound represented by the above Formula (6) are listed below.

Examples include, but are not limited to: 4,4'-[(3-hydroxyphenyl)methylene]bis(2,6-dimethylphenol), 4,4'-[(3-hydroxyphenyl)methylene]bis(2,3,6-trimethylphenol), 4,4'-[(4-hydroxyphenyl)methylene]bis(2,6-dimethylphenol), 4,4'-[(4-hydroxyphenyl)methylene]bis(2,3,6-trimethylphenol), 4,4'-[(2-hydroxy-3-methoxyphenyl)methylene]bis(2,6-dimethylphenol), 4,4'-[(4-hydroxy-3-ethoxyphenyl)methylene]bis(2,3,6-trimethyl-ethyl phenol), 4,4'-[(3,4- dihydroxyphenyl)methylene]bis(2,6-dimethylphenol), 4,4'-[(3,4-dihydroxyphenyl)methylenebis(2,3,6-trimethylphenol), 2,2'-[(4-hydroxyphenyl)methylene]bis(3,5,6-trimethylphenol), 4,4'-[4-(4-hydroxyphenyl)cyclohexylidene]bis(2,6-dimethylphenol), 4,4'-[(2-hydroxyphenyl)methylene]-bis(2,3,6-trimethylphenol), 4,4'-[1-[4-[1-(4-hydroxy-3,5-dimethylphenyl)-1-methylethyl]phenyl]ethylidene]bis(2,6-dimethylphenol), 4,4'-[1-[4-[1-(4-hydroxy-3-fluorophenyl)-1-methylethyl]phenyl]ethylidene]bis(2,6-dimethylphenol), 2,6-bis[(4-hydroxy-3,5-dimethylphenyl)ethyl]-4-methylphenol, 2,6-bis[(4-hydroxy-2,3,6-trimethylphenyl)methyl]-4-methylphenol, 2,6-bis[(4-hydroxy-3,5,6-trimethylphenyl)methyl]-4-ethylphenol, 2,4-bis[(4-hydroxy-3-methylphenyl)methyl]-6-methylphenol, 2,6-bis[(4-hydroxy-3-methylphenyl)methyl]-4-methylphenol, 2,4-bis[(4-hydroxy-3-cyclohexylphenyl)methyl]-6-methylphenol, 2,4-bis[(4-hydroxy-3-methylphenyl)methyl]-6-cyclohexylphenol, 2,4-bis[(2-hydroxy-5-methylphenyl)methyl]-6-cyclohexylphenol, 2,4-bis[(4-hydroxy-2,3,6-trimethylphenyl)methyl]-6-cyclohexylphenol, 3,6-bis[(4-hydroxy-3,5-dimethylphenyl)methyl]-1,2-benzenediol, 4,6-bis[(4-hydroxy-3,5-dimethylphenyl)methyl]-1,3-benzenediol, 2,4,6-tris[(4-hydroxy-3,5-dimethylphenyl)methyl]-1,3-benzenediol, 2,4,6-tris[(2-hydroxy-3,5-dimethylphenyl)methyl]-1,3-benzenediol, 2,2'-methylenebis[6-[(4/2-hydroxy-2,5/3,6-dimethylphenyl)methyl]-4-methylphenol], 2,2'-methylenebis[6-[(4-hydroxy-3,5-dimethylphenyl)methyl]-4-methylphenol], 2,2'-methylenebis[6-[(4/2-hydroxy-2,3,5/3,4,6-trimethylphenyl)methyl]-4-methylphenol], 2,2'-methylenebis[6-[(4-hydroxy-2,3,5-trimethylphenyl)methyl]-4-methylphenol], 4,4'-methylenebis[2-[(2,4-dihydroxyphenyl)methyl]-6-methylphenol, 4,4'-methylenebis[2-[(2,4-dihydroxyphenyl)methyl]-3,6-dimethylphenol], 4,4'-methylenebis[2-[(2,4-dihydroxy-3-methylphenyl)methyl]-3,6-dimethylphenol], 4,4'-methylenebis[2-[(2,3,4-trihydroxyphenyl)methyl]-3,6-dimethylphenol], 6,6'-methylenebis[4-[(4-hydroxy-3,5-dimethylphenyl)methyl]-1,2,3-benzenetriol, 1,1-bis(2-methyl-4-hydroxy-5-t-butylphenyl)butane, 4,4'-cyclohexylidenebis[2-cyclohexyl-6-[(2-hydroxy-5-methylphenyl)methyl]phenol], 4,4'-cyclohexylidenebis[2-cyclohexyl-6-[(4-hydroxy-3,5-dimethylphenyl)methyl]phenol], 4,4'-cyclohexylidenebis[2-cyclohexyl-6-[(4-hydroxy-2-methyl-5-cyclohexylphenyl)methyl]phenol], 4,4'-cyclohexylidenebis[2-cyclohexyl-6-[(2,3,4-trihydroxyphenyl)methyl]phenol], 4,4',4'',4'''-(1,2-ethanediylidene)tetrakis(2,6-dimethylphenol), 4,4',4'',4'''-(1,4-phenylenedimethylidene)tetrakis(2,6-dimethylphenol), and 1,1,3-tris-(2-methyl-4-hydroxy-5-tert-biphenylphenyl).

Although the number of phenolic hydroxy groups in the polyhydric phenolic compound is not specifically limited so long as there are at least 2 phenolic hydroxy groups, a larger number of polyphenylene ether terminals may result in a large change in molecular weight upon heating. Therefore, the number of phenolic hydroxy groups is preferably 3 to 6, and more preferably 3 or 4.

Particularly preferred polyhydric phenolic compounds are 4,4'-[(4-hydroxyphenyl)methylene]bis(2,6-dimethylphenol), 4,4'-[(3-hydroxyphenyl)methylene]bis(2,6-dimethylphenol), 4,4'-[(4-hydroxyphenyl)methylene]bis(2,3,6-trimethylphenol), 4,4'-[(3-hydroxyphenyl)methylene]bis(2,3,6-trimethylphenol), 4,4',4'',4'''-(1,4-phenylenedimethylidene)tetrakis(2,6-dimethylphenol), 1,1,3-tris-(2-methyl-4-hydroxy-5-tert-butylphenyl)butane, and 1,1-bis(2-methyl-4-hydroxy-5-t-butylphenyl)butane.

The polyfunctional polyphenylene ether composition of the present embodiment contains 60 mol % or more, preferably 70 mol % or more, more preferably 80 mol % or more, and even more preferably 90 mol % or more of a polyphenylene ether having a structure of the above Formula (1), with respect to the sum of the moles of monofunctional polyphenylene ethers represented by the following Formula (7), a bifunctional polyphenylene ether represented by the following Formula (8), and the polyphenylene ether having the structure of the above Formula (1).

The polyfunctional polyphenylene ether composition of the present embodiment may contain by-products generated when a polyphenylene ether having the structure of the above Formula (1) is produced.

Examples of such by-products include a monofunctional polyphenylene ether represented by the following Formula (7), and a bifunctional polyphenylene ether having a central biphenyl structure represented by the following Formula (8).

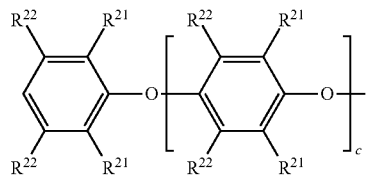

Formula (7)

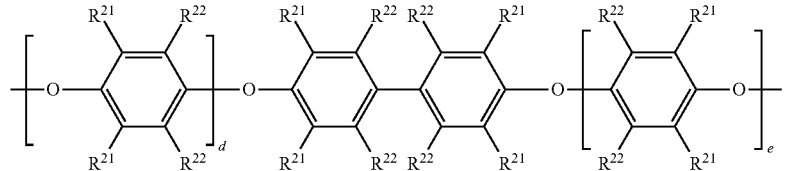

Formula (8)

In the above Formulae (7) and (8), c, d, and e are each an arbitrary integer from 1 to 100. $R^{21}$ and $R^{22}$ may be similar to, and are preferably the same as the corresponding ones in the above Formula (4).

The monofunctional polyphenylene ether represented by the above Formula (7) is a by-product generated by oxidative polymerization of a monohydric phenolic compound having the structure of the above Formula (5). Further, the bifunctional polyphenylene ether having a central biphenyl structure represented by the above Formula (8) is a by-product generated by oxidative polymerization of a biphenyl compound generated by C—C coupling of monohydric phenolic compounds having a structure of the above Formula (5) and another monohydric phenolic compound.

When a content ratio of a polyphenylene ether having a structure of the above Formula (1) is 60 mol % or more in the polyfunctional polyphenylene ether composition, by-products (e.g., by-products having a structure represented by the above Formula (7) or (8)) is reduced relative to the polyfunctional polyphenylene ether component. As a result, properties as a polyphenylene ether composition, particularly a long-term solubility in a solvent and a low viscosity when being dissolved in a solvent, are achieved.

In the polyfunctional polyphenylene ether composition of the present embodiment, the polyfunctional polyphenylene ether having the structure of the above Formula (1) can also be produced by a redistribution reaction in which the monofunctional polyphenylene ether is equilibrated with a polyhydric phenol in the presence of an oxidizing agent. Redistribution reactions are well-known in the art, and are disclosed, for example, in U.S. Pat. No. 3,496,236 B to Cooper et al. and U.S. Pat. No. 5,880,221 B to Liska et al.

However, in production of a polyfunctional polyphenylene ether composition using a redistribution reaction, peroxides are often used as a reaction initiator and an oxidizing agent. However, peroxides are highly reactive and produce various by-products. One representative example of by-products thereof is a peroxide adduct to the polyphenylene ether which is produced. Further, by-products through addition of a peroxide to not only a polyfunctional polyphenylene ether which is the target product but also to a monofunctional polyphenylene ether or a polyhydric phenol which are the raw materials are generated. As a result, the purity of the polyfunctional polyphenylene ether having the structure of the above Formula (1) which is the target product would decrease.

Whether by-products produced through addition of peroxides is present or not can be determined by a $^1$H-NMR measurement. In a $^1$H-NMR measurement result, the peroxide-derived peak appears in a wide range, among which a region of 7.6 to 8.3 ppm does not overlap with peaks derived from the phenolic raw material or the polyphenylene ether composition.

In the polyfunctional polyphenylene ether composition of the present embodiment, the ratio of the integrated value of the peak derived from the peroxide appearing in the region of 7.6 to 8.3 ppm described above to the integrated value of the peak derived from the central phenol site represented by the above Formula (2) contained in the above Formula (1) in a $^1$H-NMR measurement result is 1 or less, preferably 0.8 or less, and more preferably 0.5 or less. The ratio of the integrated value of the peroxide-derived peak being 1 or less to the integrated value of the peak derived from the center phenol site described above means that no by-produced peroxide adduct is contained in the polyfunctional polyphenylene ether composition and the purity of the polyfunctional polyphenylene ether of the target product is high. As a result, the glass transition temperature (Tg) of the polyphenylene ether composition can be increased.

This ratio can be measured by using the method described in the Examples section below.

The number average molecular weight (Mn) of the polyfunctional polyphenylene ether composition in the present embodiment is from 500 to 15,000 g/mol, preferably from 1,000 to 10,000 g/mol, and more preferably from 2,000 to 8,000 g/mol. When the number average molecular weight (Mn) is within any of the above ranges, the fluidity when being dissolved in a solvent for preparing a varnish in the application step to a substrate material is further improved and the workability upon application to the substrate material can be assured.

The number average molecular weight can be measured by using the method described in the Examples section below.

The number of OH terminals in the polyfunctional polyphenylene ether composition in the present embodiment is not particularly limited. Among them, the number of OH terminals contained in the composition is preferably from 1000 to 3000 μmol/g, more preferably from 1000 to 2000 μmol/g, even more preferably from 1200 to 2000 μmol/g. When the number of OH terminals in the composition is 1000 μmol/g or more, the crosslinking density can be increased upon terminal modification and thermosetting of the polyfunctional polyphenylene ether composition, and a cured product having a high glass transition temperature and excellent dielectric characteristics tends to be obtained. When the number of OH terminals in the composition is 3000 μmol/g or less, the viscosity of a varnish prepared by dissolving the polyfunctional polyphenylene ether composition in a solvent can be reduced and a good workability tends to be achieved upon application to a substrate material.

The number of OH terminals can be measured by using the method described in the Examples section below.

The liquid viscosity of the polyfunctional polyphenylene ether composition of the present embodiment is preferably 35 mPa·s or less, more preferably 30 mPa·s or less, and even more preferably 25 mPa·s or less.

The liquid viscosity can be measured by using the method described in the Examples section below.

Because the polyfunctional polyphenylene ether composition in the present embodiment is preferably heated to at least a temperature for drying a varnish and a temperature applied for thermosetting the varnish composition upon production of a substrate material, the glass transition temperature thereof is preferably 120° C. or higher, and more preferably 140° C. or higher.

<Production Method of Polyfunctional Polyphenylene Ether Composition>

In a production method of a polyfunctional polyphenylene ether composition of the present embodiment, preferably, at least one aromatic solvent is used as a polymerization solvent and a copper catalyst and an amine-based ligand are used as polymerization catalysts. Such a production method can favorably produce a polyfunctional polyphenylene ether composition of the present embodiment.

(Polymerization Step)

Here, in the production method of the polyfunctional polyphenylene ether composition of the present embodiment, it is preferable to use an aromatic solvent which is a good solvent of the polyfunctional polyphenylene ether composition as a polymerization solvent in a polymerization step.

Here, a good solvent of the polyfunctional polyphenylene ether composition refers to a solvent capable of dissolving the polyfunctional polyphenylene ether, and examples of such a solvent include aromatic hydrocarbons such as benzene, toluene, xylene (including o-, m-, and p-isomers), ethylbenzene, and styrene; halogenated hydrocarbons such as chlorobenzene and dichlorobenzene; and nitro compounds such as nitrobenzene, for example.

As the polymerization catalyst used in the present embodiment, well-known catalyst systems which can be generally used for production of polyphenylene ethers can be used. Catalyst systems composed of a transition metal ion having oxidation-reduction capability and an amine compound capable of forming a complex with the transition metal ion are well known, and examples thereof include a catalyst system composed of a copper compound and an amine compound, a catalyst system composed of a manganese compound and an amine compound, and a catalyst system composed of a cobalt compound and an amine compound, for example. Because the polymerization reaction proceeds efficiently under a slight alkaline condition, a small amount of an alkaline or an additional amine compound may be added in the system.

The polymerization catalyst used in the present embodiment is preferably a catalyst composed of a copper compound, a halogen compound, and an amine compound as the components of the catalyst, and more preferably a catalyst containing a diamine compound represented by the general formula (9) as the amine compound.

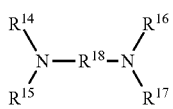

Formula (9)

In Formula (9), $R^{14}$, $R^{15}$, $R^{16}$, and $R^{17}$ are each independently a hydrogen atom or a linear or branched alkyl group having a carbon number of 1 to 6. However, $R^{14}$, $R^{15}$, $R^{16}$, and $R^{17}$ cannot be all hydrogen atoms. $R^{18}$ is an alkylene group having a carbon number of 2 to 5 which is linear or has a methyl branch.

Examples of the copper compound as the component of the catalyst described herein are listed. The preferred copper compound that can be used may be a cuprous compound, a cupric compound or a mixture thereof. Examples of the cupric compound include cupric chloride, cupric bromide, cupric sulfate, and cupric nitrate. Examples of the cuprous compound include cuprous chloride, cuprous bromide, cuprous sulfate, and cuprous nitrate. Among these metal compounds, cuprous chloride, cupric chloride, cuprous bromide, and cupric bromide are particularly preferable. Copper salts of these may be synthesized from an oxide (for example, cuprous oxide), carbonate, hydroxide, or the like and a corresponding halogen or acid at the time of use. A frequently used method includes preparing a mixture of a cuprous oxide and a hydrogen halide (or a solution of the hydrogen halide) as exemplified above in advance.

Examples of the halogen compound include hydrogen chloride, hydrogen bromide, hydrogen iodide, sodium chloride, sodium bromide, sodium iodide, potassium chloride, potassium bromide, potassium iodide, tetramethylammonium chloride, tetramethylammonium bromide, tetramethylammonium iodide, tetraethylammonium chloride, tetraethylammonium bromide, and tetraethylammonium iodide, for example. These may be used in the form of an aqueous solution or a solution with an appropriate solvent. These halogen compounds may be used alone or in combination of two or more as the component. A preferred halogen compound is an aqueous solution of hydrogen chloride or an aqueous solution of hydrogen bromide.

The amount of these compounds to be used is not particularly limited, but the amount of halogen atoms is preferably 2 times or more and 20 times or less of the molar amount of copper atoms, and the amount of the copper atoms to be used is preferably in the range of 0.02 mol to 0.6 mol with respect to 100 mol of the phenolic compound to be added in the polymerization reaction.

Next, examples of the diamine compound as the component of the catalyst are listed. Examples include N,N,N',N'-tetramethylethylenediamine, N,N,N'-trimethylethylenediamine, N,N'-dimethylethylenediamine, N,N-dimethylethylenediamine, N-methylethylenediamine, N,N,N',N'-tetraethylethylenediamine, N,N,N'-triethylethylenediamine, N,N'-diethylethylenediamine, N,N-diethylethylenediamine, N-ethylethylenediamine, N,N-dimethyl-N'-ethylethylenediamine, N,N'-dimethyl-N-ethylethylenediamine, N-n-propylethylenediamine, N,N'-n-propylethylenediamine, N-i-propylethylenediamine, N,N'-i-propylethylenediamine, N-n-butylethylenediamine, N,N'-n-butylethylenediamine, N-i-butylethylenediamine, N,N'-i-butylethylenediamine, N-t-butylethylenediamine, N,N'-t-butylethylenediamine, N,N,N',N'-tetramethyl-1,3-diaminopropane, N,N,N'-trimethyl-1,3-diaminopropane, N,N'-dimethyl-1,3-diaminopropane, N-methyl-1,3-diaminopropane, N,N,N',N'-tetramethyl-1,3-diamino-1-methylpropane, N,N,N',N'-tetramethyl-1,3-diamino-2-methylpropane, N,N,N',N'-tetramethyl-1,4-diaminobutane, and N,N,N',N'-tetramethyl-1,5-diaminopentane, for example. Preferred diamine compounds for the present embodiment are those in which the alkylene group connecting two nitrogen atoms has a carbon number of 2 or 3. Although the amount of such a diamine compound that is used is not specifically limited, the amount is preferably in a range of 0.01 mol to 10 mol with respect to 100 mol of the phenolic compound to be added in the polymerization reaction.

In the present embodiment, a primary amine and a secondary monoamine may be included as components of the polymerization catalyst. Examples of the secondary monoamine include, but are not limited to, dimethylamine, diethylamine, di-n-propylamine, di-i-propylamine, di-n-butylamine, di-i-butylamine, di-t-butylamine, dipentylamines, dihexylamines, dioctylamines, didecylamines, dibenzylamines, methylethylamine, methylpropylamine, methylbutylamine, cyclohexylamine, N-phenylmethanolamine, N-phenylethanolamine, N-phenylpropanolamine, N-(m-methylphenyl)ethanolamine, N-(p-methylphenyl)ethanolamine, N-(2',6'-dimethylphenyl)ethanolamine, N-(p-chlorophenyl)ethanolamine, N-ethylaniline, N-butylaniline, N-methyl-2-methylaniline, N-methyl-2,6-dimethylaniline, and diphenylamine, for example.

A tertiary monoamine compound may also be included as a component of the polymerization catalyst in the present embodiment. A tertiary monoamine compound refers to an aliphatic tertiary amine, inclusive of an alicyclic tertiary amine. Examples thereof include trimethylamine, triethylamine, tripropylamine, tributylamine, triisobutylamine, dimethylethylamine, dimethylpropylamine, allyldiethylamine, dimethyl-n-butylamine, diethylisopropylamine, and N-methylcyclohexylamine, for example. These tertiary monoamines may be used alone or in combination of two or more. The amount thereof to be used is not particularly limited, but is preferably in a range of 15 mol or less with respect to 100 mol of the phenolic compound to be added to the polymerization reaction.

In the present embodiment, there is no limitation on addition of a surfactant which is conventionally known to have an effect of enhancing polymerization activity. The surfactant may, for example, be trioctylmethylammonium chloride known by the product names Aliquat 336 and CapRiquat. The amount thereof to be used is preferably within a range not exceeding 0.1% by mass with respect to 100% by mass of the total amount of the polymerization reaction mixture.

Examples of oxygen-containing gases for polymerization of the present embodiment include pure oxygen, a mixture of oxygen and an inert gas such as nitrogen in any ratio, air, and a mixture of air and an inert gas such as nitrogen in any ratio, for example. It is suffice that the internal pressure during the polymerization reaction is normal pressure, but a reduced pressure or an increased pressure may be used if necessary.

The temperature of the polymerization is not particularly limited, but is in the range of 0 to 60° C., preferably 10 to 50° C., because the reaction becomes difficult to proceed when the temperature it is too low, whereas the reaction selectivity may be reduced and high molecular weight components may be generated when it is too high.

In the production method of the polyfunctional polyphenylene ether composition of the present embodiment, polymerization is preferably performed in a solution state upon polymerization of polyphenylene ether (such a polymerization is herein also referred to as "solution polymerization"). By production by means of solution polymerization, even when the central phenol has a bulky structure, the ratios of generation of a polyphenylene ether component containing no structure of the above Formula (1) or by-products generated from peroxides are reduced, and a polyfunctional polyphenylene ether containing the structure of the above Formula (1) of the target product can be generated with a high purity.

(Copper Extraction and by-Product Removal Step)

In the present embodiment, there is no particular limitation on the post-treatments after the polymerization reaction is completed. Typically, an acid such as hydrochloric acid or acetic acid, or ethylenediaminetetraacetic acid (EDTA) and a salt thereof, nitrilotriacetic acid and a salt thereof, or the like is added to the reaction solution for deactivating the catalyst. Further, by-produced dihydric phenol products generated by polymerization of polyphenylene ether can be removed using a conventional well-known method. In the case where metal ions serving as the catalyst have been substantially deactivated as described above, the mixture is decolorized only by heating. A method in which a required amount of a well-known reducing agent is added is also employed. Examples of the well-known reducing agent include hydroquinone and sodium dithionite, for example.

(Liquid-Liquid Separation Step)

In the production method of the polyfunctional polyphenylene ether composition of the present embodiment, water may be added to extract the compound in which the copper catalyst has been deactivated, followed by liquid-liquid separation between the organic phase and the aqueous phase, and the aqueous phase is then separated from the organic phase to remove the copper catalyst. Examples of this liquid-liquid separation step include, but are not particularly limited to, settled separation and separation by a centrifuge. A well-known surfactant or the like may be employed for promoting the liquid-liquid separation described above.

(Concentration and Drying Step)

Subsequently, in the production method of the polyfunctional polyphenylene ether composition of the present embodiment, the organic phase containing the polyfunctional polyphenylene ether composition obtained after the liquid-liquid separation may be concentrated and dried by volatilizing the solvent.

Examples of the method of volatilizing the solvent contained in the organic phase include, but are not particularly limited to, a method in which the organic phase is transferred to a concentration tank set to a high temperature to distill off the solvent for concentration, and a method in which toluene is distilled off using an instrument such as a rotary evaporator for concentration.

The temperature of drying in the drying step is preferably at least 60° C. or higher, more preferably 80° C. or higher, even more preferably 120° C. or higher, and most preferably 140° C. or higher. Drying of the polyfunctional polyphenylene ether composition at a temperature of at least 60° C. can efficiently reduce the content of a high boiling point volatile component in the polyphenylene ether powder.

Methods effective for obtaining a polyfunctional polyphenylene ether composition at high efficiency include raising drying temperature, increasing the degree of vacuum in a drying atmosphere, performing stirring during drying, and the like; among these, particularly preferred from the perspective of production efficiency is raising drying temperature. The drying step is preferably carried out using a dryer equipped with a mixing function. The mixing function may be implemented by a stirring-type dryer, a rolling-type dryer, or the like. This increases throughput and maintains high productivity.

The production method of the polyfunctional polyphenylene ether composition of the present embodiment is not limited to the production method of the polyfunctional polyphenylene ether composition of the present embodiment described above, and the order and the number of times of the polymerization step, the copper extraction and by-product removal step, the liquid-liquid separation step, and the concentration and drying step, and the like described above may be appropriately modified.

<Polyfunctional Modified Polyphenylene Ether Composition>

A polyfunctional modified polyphenylene ether composition according to the present embodiment includes a polyphenylene ether having a structure represented by the following Formula (1)'. This modified polyphenylene ether composition contains 60 mol % or more of a modified polyphenylene ether having a structure represented by the following Formula (1)' and a modified or unmodified polyphenylene ether in which at least one ($-Y_n$-A) is ($-Y_n-$H) in the structure represented by the following Formula (1)', wherein the ratio of the integrated value of the peak appearing at 7.6 to 8.3 ppm to the integrated value of the peak derived from the structure represented by the following Formula (2)' in a $^1$H-NMR measurement result is 1 or less, and the number average molecular weight in terms of polystyrene is 500 to 15000 g/mol.

The modified polyphenylene ether composition of the present embodiment may contain one or two or more modified polyphenylene ethers having a structure represented by the following Formula (1)'. Further, the modified polyphenylene ether composition of the present embodiment may contain a modified polyphenylene ether in which one or more ($-Y_n$-A) are ($-Y_n-$H) and not all ($-Y_n$-A) are ($-Y_n-$H) in the structure of the following Formula (1)', and an unmodified polyphenylene ether in which all ($-Y_n$-A) are ($-Y_n-$H) in the structure of the following Formula (1)'. Here, Y and n in ($-Y_n$-A) of the modified polyphenylene ether are preferably the same as Y and n in ($-Y_n-$H) of the unmodified polyphenylene ether.

The polyfunctional modified polyphenylene ether composition of the present embodiment may further contain additives such as a solvent, a polymerization catalyst, and a surfactant. The polyfunctional modified polyphenylene ether composition of the present embodiment may be a solid.

(Modified Polyphenylene Ether)

The above modified polyphenylene ether preferably has a structure represented by the following Formula (1)'.

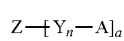 Formula (1)'

In Formula (1)', a (—Y$_n$-A) bonded to Z may be the same or different. Z is an a-valent central phenol site represented by the following Formula (2)'. A is an integer of 2 to 6.

The central phenol site refers to the central skeleton serving as a starting point of a reaction upon polymerization of a polyfunctional polyphenylene ether, and the structure thereof can be identified by analyzing the polyfunctional modified polyphenylene ether composition by a technique such as NMR and mass spectrometry. Examples of a specific method for identifying the structure of the central phenol site from the polyfunctional modified polyphenylene ether composition include a method in which only low molecular weight components are analyzed from a result of mass spectrometry of the polyfunctional modified polyphenylene ether composition, and the structure of the central phenol site is estimated from peaks of fragment ions by EI. Alternatively, a method is exemplified in which the structure of the central phenol site is estimated by performing an NMR measurement of the polyfunctional modified polyphenylene ether composition and comparing it with NMR measurement results of known polyfunctional phenolic compounds. By combining a mass spectrometry result and an NMR measurement result, the structure of the central phenol site can be identified more accurately.

The above modified polyphenylene ether may have a structure in which a partial structures (e.g., phenols optionally substituted with R$^5$ or the like) are bonded to the a-valent central portion X, and (—Y$_n$-A) of Formula (1)' is bonded to an a-valent partial structure (i.e., the central phenol site represented by Formula (2)').

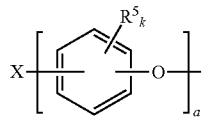 Formula (2)'

(In Formula (2)', a may be an integer similar to the corresponding integer in Formula (1)', and is preferably the same integer as that in Formula (1)'. In the central phenol site in Formula (2)', each of the a partial structures may have the same structure or different structures. Among them, it is preferable that each of the a partial structures has the same structure from the viewpoint of obtaining a modified polyphenylene ether composition having a further higher glass transition temperature and further excellent long-term solubility in a solvent and exhibiting a further lower viscosity when being dissolved in a solvent).

In Formula (2)', X is an optional a-valent linking group, and examples thereof include, but are not particularly limited to, a hydrocarbon group such as a chain hydrocarbon and a cyclic hydrocarbon; a hydrocarbon group containing one or more atoms selected from nitrogen, phosphorus, silicon, and oxygen; an atom such as nitrogen, phosphorus, and silicon; and a combination of these. X may be a linking group excluding a single bond.

X may be a linking group connecting the a-valent partial structures to each other.

Examples of the above X include an a-valent alkyl skeleton bonded to the benzene ring to which R$^5$ is bonded, via a single bond, an ester bond, or the like, an a-valent aryl skeleton bonded to the benzene ring to which R$^5$ is bonded, via a single bond, an ester bond, or the like, and an a-valent heterocyclic skeleton bonded to the benzene ring to which R$^5$ is bonded, via a single bond, an ester bond, or the like.

Here, examples of the alkyl skeleton include, but are not particularly limited to, a skeleton in which branched terminals of a chain hydrocarbon (e.g., a chain saturated hydrocarbon) branched into at least a branches having a carbon number of 2 to 6 are directly bonded to the benzene ring of the partial structure (it is suffice that the benzene ring is bonded to the a branched terminals, and there may be a branched terminal not bonded to the benzene ring), for example. Examples of the aryl skeleton include, but are not particularly limited to, a skeleton in which a benzene ring, a mesitylene group, or a 2-hydroxy-5-methyl-1,3-phenylene group is bonded to the benzene ring to which R$^5$ is bonded, via a single bond or an alkyl chain, for example. Examples of the heterocyclic skeleton include, but are not particularly limited to, a skeleton in which a triazine ring is bonded to the benzene ring to which R$^5$ is bonded, via a single bond or an alkyl chain, for example.

In Formula (2)', R$^5$ are each independently an optional substituent, and k are each independently an integer of 1 to 4.

Examples of the above R$^5$ include a linear alkyl group having a carbon number of 1 to 8 such as a methyl group, an ethyl group, and an n-propyl group, and a group having a partial structure of the following Formula (3)', and at least one R$^5$ is preferably a partial structure of the following Formula (3)'.

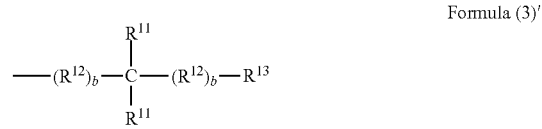 Formula (3)'

In Formula (3)',
R$^{11}$ are each independently optionally substituted alkyl group having a carbon number of 1 to 8,
R$^{12}$ are each independently optionally substituted alkylene group having a carbon number of 1 to 8, and b are each independently 0 or 1, and
R$^{13}$ represents one of a hydrogen atom, an optionally substituted alkyl group having a carbon number of 1 to 8, and a phenyl group.

An example of the above substituent is a halogen atom.

The above Formula (3)' is preferably a group containing secondary and/or tertiary carbon exemplified by an isopropyl group, an isobutyl group, a sec-butyl group, a tert-butyl group, a tert-amyl group, a 2,2-dimethylpropyl group, and a structure with a phenyl group at a terminal of any of these, and is more preferably a tert-butyl group.

In an a-valence partial structure of the above Formula (2), when the position of the carbon atom of the benzene ring to which —O— is bonded in Formula (2) is designated as Position 1, R$^5$ having the partial structure of Formula (3)' is bonded to one carbon atom at Position 2 or Position 6, and a hydrogen atom, a methyl group, or an ethyl group is bonded to the other carbon atom at Position 2 or Position 6. A structure in which a hydrocarbon group or a partial structure of the above Formula (3)' is bonded to the carbon atom at Position 2 or Position 6 may also be possible. In the benzene ring in the above Formula (2)', ($Y_n$-A) in the above Formula (1)' may be bonded to a carbon atom at a position other than Position 2 or Position 6 via the central portion X and an oxygen atom. Preferably, ($Y_n$-A) in the above Formula (1)' is bonded to Position 1 via an oxygen atom, and the central portion X is bonded to Position 4.

In the above Formula (1)', Y are each independently a bivalent linking group having a structure of the following Formula (4)' (phenol unit having a substituent), n represents a repeating number of Y and are each independently an integer of 0 to 200, and at least one n is an integer of 1 or more.

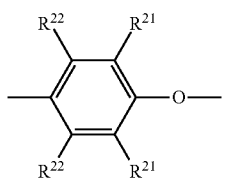

Formula (4)'

In the above Formula (4)', each $R^{21}$ independently represents a hydrogen atom; an optionally substituted hydrocarbon group having a carbon number of 1 to 6; an optionally substituted aryl group having a carbon number of 6 to 12; or a halogen atom; preferably a saturated or unsaturated hydrocarbon group having a carbon number of 1 to 6, more preferably a methyl group, an ethyl group, an n-propyl group, a vinyl group, an aryl group, an ethynyl group, or a propargyl group, more preferably a methyl group or an ethyl group, and particularly preferably a methyl group. In the above Formula (4)', two $R^{21}$ cannot be both hydrogen atoms, and two $R^{21}$ are not in a combination in which one $R^{21}$ is the partial structure represented by the above Formula (3)' and the other $R^{21}$ is one of a hydrogen atom, a methyl group, or an ethyl group.

$R^{22}$ each independently represents a hydrogen atom; an optionally substituted hydrocarbon group having a carbon number of 1 to 6; an optionally substituted aryl group having a carbon number of 6 to 12; or a halogen atom; preferably a hydrogen atom or an optionally substituted saturated or unsaturated hydrocarbon group having a carbon number of 1 to 6, more preferably a hydrogen atom, a methyl group, an ethyl group, or an n-propyl group, even more preferably a hydrogen atom or a methyl group, and particularly preferably a hydrogen atom.

An example of the above substituent is a halogen atom.

In the above Formula (1)', A are each independently a substituent containing a carbon-carbon double bond and/or an epoxy bond.

The above A is a substituent represented by the following Formula (5)' from the viewpoint of obtaining a modified polyphenylene ether composition having a further high glass transition temperature, a further excellent long-term solubility in a solvent, and exhibiting a further lower viscosity when being dissolved in a solvent.

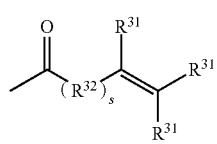

Formula (5)'

In Formula (5)', $R^{31}$ are each independently a hydrogen atom, a hydroxyl group or hydrocarbon group having a carbon number of 1 to 30 (e.g., a chain hydrocarbon group or a cyclic hydrocarbon group), an aryl group, an alkoxy group, an allyloxy groups, an amino group, or a hydroxyalkyl group. $R^{32}$ are each independently a hydrocarbon group having a carbon number of 1 to 30 (e.g., an alkylene group). s is an integer between 0 and 5.

Specific examples of the hydrocarbon group of $R^{31}$ include methyl, ethyl, n-propyl, 2-butyl, n-butyl, isobutyl, t-butyl, n-pentyl, 1-ethylpropyl, 1-methylbutyl, 2-methylbutyl, 3-methylbutyl, amyl, cyclopentyl, 2,2-dimethylpropyl, 1,1-dimethylpropyl, n-hexyl, cyclohexyl, 1-ethylbutyl, 2-ethylbutyl, 3-ethylbutyl, 1-methylpentyl, 2-methylpentyl, 3-methylpentylene, 4-methylpentylene, 1,1-dimethylbutylene, 2,2-dimethylbutylene, 3,3-dimethylbutyl, 1,2-dimethylbutyl, 1,3-dimethylbutyl, 2,3-dimethylbutyl, n-heptyl, 1-methylhexyl, 2-methylhexyl, 3-methylhexyl, 4-methylhexyl, 5-methylhexyl, 1-ethylpentyl, 2-ethylpentyl, 3-ethylpentyl, 1,1-dimethylpentyl, 2,2-dimethylpentyl, 3,3-dimethylpentyl, 4,4-dimethylpentyl, 1,2-dimethylpentyl, 1,3-dimethylpentyl, 1,4-dimethylpentyl, 2,3-dimethylpentyl, 2,4-dimethylpentyl, 3,4-dimethylpentyl, 2-methyl-3,3-dimethylbutyl, 1-methyl-3,3-dimethylbutyl, 1,2,3-trimethylbutyl, 1,3-dimethyl-2-pentyl, 2-isopropylbutyl, 2-methylcyclohexyl, 3-methylcyclohexyl, 4-methylcyclohexyl, 1-cyclohexylmethyl, 2-ethylcyclopentyl, 3-ethylcyclopentyl, 2,3-dimethylcyclopentyl, 2,4-dimethylcyclopentyl, 2-methylcyclopentylmethyl, 2-cyclopentylethyl, 1-cyclopentylethyl, n-octyl, 2-octyl, 3-octyl, 4-octyl, 2-methylheptyl, 3-methylheptyl, 4-methylheptyl, 5-methylheptyl, 6-methylheptyl, 2-ethylhexyl, 3-ethylhexyl, 4-ethylhexyl, 5-ethylhexyl, 1,1-dimethylhexyl, 2,2-dimethylhexyl, 3,3-dimethylhexyl, 4,4-dimethylhexyl, 5,5-dimethylhexyl, 1,2-dimethylhexyl, 1,3-dimethylhexyl, 1,4-dimethylhexyl, 1,5-dimethylhexyl, 2,3-dimethylhexyl, 2,4-dimethylhexyl, 2,5-dimethylhexyl, 1,1-ethylmethylpentyl, 2,2-ethylmethylpentyl, 3,3-ethylmethylpentyl, 4,4-ethylmethylpentyl, 1-ethyl-2-methylpentyl, 1-ethyl-3-methylpentyl, 1-ethyl-4-methylpentyl, 2-ethyl-1-methylpentyl, 3-ethyl-1-methylpentyl, 4-ethyl-1-methylpentyl, 2-ethyl-3-methylpentyl, 2-ethyl-4-methylpentyl, 3-ethyl-2-methylpentyl, 4-ethyl-3-methylpentyl, 3-ethyl-4-methylpentyl, 4-ethyl-3-methylpentyl, 1-(2-methylpropyl)butyl, 1-(2-methylpropyl)-2-methylbutyl, 1,1-(2-methylpropyl)ethyl, 1,1-(2-methylpropyl)ethylpropyl, 1,1-diethylpropyl, 2,2-diethylpropyl, 1,1-ethylmethyl-2,2-dimethylpropyl, 2,2-ethylmethyl-1,1-dimethylpropyl, 2-ethyl-1,1-dimethylbutyl, 2,3-dimethylcyclohexyl, 2,3-dimethylcyclohexyl, 2,5-dimethylcyclohexyl, 2,6-dimethylcyclohexyl, 3,5-dimethylcyclohexyl, 2-methylcyclohexylmethyl, 3-methylcyclohexylmethyl, 4-methylcyclohexylmethyl, 2-ethylcyclohexyl, 3-ethylcyclohexyl, 4-ethylcyclohexyl, 2-cyclohexylethyl, 1-cyclohexylethyl, 1-cyclohexyl-2-ethylene, nonyl, isononyl, decyl, isodecyl, undecyl, dodecyl, benzyl, and 2-phenylethyl; preferably methyl, ethyl, n-propyl, 2-propyl, n-butyl, isobutyl, t-butyl, n-pentyl, 1-ethylpropyl, 1-methylbutyl, 2-methylbutyl, 3-methylbutyl, amyl, cyclopentyl, n-hexyl, cyclohexyl, 1-ethylbutyl, 2-ethylbutyl, 3-ethylbutyl, 1-methylpentyl, 2-methylpentyl, 3-methylpentyl, 4-methylpentyl, n-heptyl, 1-methylhexyl, 2-methylhexyl, 3-methylhexyl, 4-methylhexyl, 5-methylhexyl, 1-ethylpentyl, 2-ethylpentyl, 3-ethylpentyl, 2-methylcyclohexyl, 3-methylcyclohexyl, 4-methylcyclohexyl, n-octyl, 2-octyl, 4-octyl, 4-octyl, 2-methylheptyl, 3-methylheptyl, 4-methylheptyl, 5-methylheptyl, 6-methylheptyl, 2-ethylhexyl, 3-ethylhexyl, 4-ethylhexyl, 5-ethylhexyl, nonyl, isononyl, decyl, isodecyl, undecyl, dodecyl, and benzyl; more preferably methyl, ethyl, n-propyl, 2-propyl, n-butyl, isobutyl, t-butyl, n-pentyl, 1-ethylpropyl, 1-methylbutyl, 2-methylbutyl, 3-methylbutyl, amyl, cyclopentyl, n-hexyl, cyclohexyl, n-heptyl, n-octyl, 2-octyl, 3-octyl, 4-octyl, 2-methylheptyl, 3-methylheptyl, 4-methylheptyl, 5-methylheptyl, 6-methylheptyl, 2-ethylhexyl, 3-ethylhexyl, 4-ethylhexyl, 5-ethylhexyl, nonyl, isononyl, decyl, isodecyl, undecyl, dodecyl, and benzyl; and more preferably methyl, ethyl, n-propyl, 2-propyl, n-butyl, isobutyl, t-butyl, n-pentyl, amyl, cyclopentyl, n-hexyl, cyclohexyl, n-heptyl, n-octyl, 2-octyl, 3-octyl, 4-octyl, 2-methylheptyl, 3-methylheptyl, 4-methylheptyl, 5-methylheptyl, 6-methylheptyl, 2-ethylhexyl, 3-ethylhexyl, 4-ethylhexyl, 5-ethylhexyl, nonyl, isononyl, decyl, isodecyl, undecyl, dodecyl, and benzyl.

Specific examples of the hydrocarbon group of $R^{32}$ include, methylene, ethylene, trimethylene, 1,2-propylene, tetramethylene, 2-methyl-1,3-trimethylene, 1,1-dimethylethylene, pentamethylene, 1-ethyl-1,3-propylene, 1-methyl-1,4-butylene, 2-methyl-1,4-butylene, 3-methyl-1,4-butylene, 2,2-dimethyl-1,3-propylene, 1,2-cyclopentylene, 1,3-cyclopentylene, 2,2-dimethyl-1,3-propylene, 1,1-dimethyl-1,3-propylene, 3,3-dimethyl-1,3-propylene, hexamethylene, 1,2-cyclohexylene, 1,3-cyclohexylene, 1,4-cyclohexylene, 1-ethyl-1,4-butylene, 2-ethyl-1,4-butylene, 3-ethyl-1,4-butylene, 1-methyl-1,5-pentylene, 2-methyl-1,5-pentylene, 3-methyl-1,5-pentylene, 4-methylpentylene, 1,1-dimethyl-1,4-butylene, 2,2-dimethyl-1,4-butylene, 3,3-dimethyl-1,4-butylene, 1,2-dimethyl-1,4-butylene, 1,3-dimethyl-1,4-butylene, 2,3-dimethyl-1,4-butylene, heptamethylene, 1-methyl-1,6-hexylene, 2-methyl-1,6-hexylene, 3-methyl-1,6-hexylene, 4-methyl-1,6-hexylene, 5-methyl-1,6-hexylene, 1-ethyl-1,5-pentylene, 2-ethyl-1,5-pentylene, 3-ethyl-1,5-pentylene, 1,1-dimethyl-1,5-pentylene, 2,2-dimethyl-1,5-pentylene, 3,3-dimethyl-1,5-pentylene, 4,4-dimethyl-1,5-pentylene, 1,2-dimethyl-1,5-pentylene, 1,3-dimethyl-1,5-pentylene, 1,4-dimethyl-1,5-pentylene, 2,3-dimethyl-1,5-pentylene, 2,4-dimethyl-1,5-pentylene, 3,4-dimethyl-1,5-pentylene, 2-methyl-3,3-dimethyl-1,4-butylene, 1-methyl-3,3-dimethyl-1,4-butylene, 1,2,3-trimethyl-1,4-butylene, 1,3-dimethyl-1,4-pentylene, 2-isopropyl-1,4-butylene, 2-methyl-1,4-cyclohexylene, 3-methyl-1,4-cyclohexylene, 4-methyl-1,4-cyclohexylene, 1-cyclohexylmethylene, 2-ethyl-1,3-cyclopentylene, 3-ethyl-1,3-cyclopentylene, 2,3-dimethyl-1,3-cyclopentylene, 2,4-dimethyl-1,3-cyclopentylene, 2-methyl-1,3-cyclopentylmethylene, 2-cyclopentylethylene, 1-cyclopentylethylene, octamethylene, 1-methyl-1,7-heptylene, 1-ethyl-1,6-hexylene, 1-propyl-1,5-pentylene, 2-methyl-1,7-heptylene, 3-methyl-1,7-heptylene, 4-methyl-1,7-heptylene, 5-methyl-1,7-heptylene, 6-methyl-1,7-heptylene, 2-ethyl-1,6-hexylene, 3-ethyl-1,6-hexylene, 4-ethyl-1,6-hexylene, 5-ethyl-1,6-hexylene, 1,1-dimethyl-1,6-hexylene, 2,2-dimethyl-1,6-hexylene, 3,3-dimethyl-1,6-hexylene, 4,4-dimethyl-1,6-hexylene, 5,5-dimethyl-1,6-hexylene, 1,2-dimethyl-1,6-hexylene, 1,3-dimethyl-1,6-hexylene, 1,4-dimethyl-1,6-hexylene, 1,5-dimethyl-1,6-hexylene, 2,3-dimethyl-1,6-hexylene, 2,4-dimethyl-1,6-hexylene, 2,5-dimethyl-1,6-hexylene, 1,1-ethylmethyl-1,5-pentylene, 2,2-ethylmethyl-1,5-pentylene, 3,3-ethylmethyl-1,5-pentylene, 4,4-ethylmethyl-1,5-pentylene, 1-ethyl-2-methyl-1,5-pentylene, 1-ethyl-3-methyl-1,5-pentylene, 1-ethyl-4-methyl-1,5-pentylene, 2-ethyl-1-methyl-1,5-pentylene, 3-ethyl-1-methyl-1,5-pentylene, 4-ethyl-1-methyl-1,5-pentylene, 2-ethyl-3-methyl-1,5-pentylene, 2-ethyl-4-methyl-1,5-pentylene, 3-ethyl-2-methyl-1,5-pentylene, 4-ethyl-3-methyl-1,5-pentylene, 3-ethyl-4-methyl-1,5-pentylene, 4-ethyl-3-methyl-1,5-pentylene, 1-(2-methylpropyl)-1,4-butylene, 1-(2-methylpropyl)-2-methyl-1,4-butylene, 1-(2-methylpropyl)ethylene, 1,1-(2-methylpropyl)ethyl-1,3-propylene, 1,1-diethyl-1,3-propylene, 2,2-diethyl-1,3-propylene, 1,1-ethylmethyl-2,2-dimethyl-1,3-propylene, 2,2-ethylmethyl-1,1-dimethyl-1,3-propylene, 2-ethyl-1,1-dimethyl-1,4-butylene, 2,3-dimethyl-1,4-cyclohexylene, 2,3-dimethyl-1,4-cyclohexylene, 2,5-dimethyl-1,4-cyclohexylene, 2,6-dimethyl-1,4-cyclohexylene, 3,5-dimethyl-1,4-cyclohexylene, 2-methyl-1,4-cyclohexyl-1-methylene, 3-methyl-1,4-cyclohexyl-1-methylene, 4-methyl-1,4-cyclohexyl-1-methylene, 2-ethyl-1,4-cyclohexylene, 3-ethyl-1,4-cyclohexylene, 4-ethyl-1,4-cyclohexylene, 2-cyclohexylethylene, 1-cyclohexylethylene, 1-cyclohexyl-2-ethylene, nonylmethylene, 1-methyl-1,8-octylene, decylmethylene, 1-methyl-1,8-nonylene, undecylmethylene, dodecylmethylene, 1,4-phenylene, 1,3-phenylene, 1,2-phenylene, methylene-1,4-phenylene-methylene, and methylene-1,4-phenylene-ethylene; preferably methylene, ethylene, trimethylene, 1,2-propylene, tetramethylene, 2-methyl-1,2-propylene, 1,1-dimethylethylene, pentamethylene, 1-ethyl-1,3-propylene, 1-methyl-1,4-butylene, 2-methyl-1,4-butylene, 3-methyl-1,4-butylene, 2,2-dimethyl-1,3-propylene, 1,3-cyclopentylene, 1,6-hexamethylene, 1,4-cyclohexylene, 1-ethyl-1,4-butylene, 2-ethyl-1,4-butylene, 3-ethyl-1,4-butylene, 1-methyl-1,5-pentylene, 2-methyl-1,5-pentylene, 3-methyl-1,5-pentylene, 4-methyl-1,5-pentylene, heptamethylene, 1-methyl-1,6-hexylene, 2-methyl-1,6-hexylene, 3-methyl-1,6-hexylene, 4-methyl-1,6-hexylene, 5-methyl-1,6-hexylene, 1-ethyl-1,5-pentylene, 2-ethyl-1,5-pentylene, 3-ethyl-1,5-pentylene, 2-methyl-1,4-cyclohexylene, 3-methyl-1,4-cyclohexylene, 4-methyl-1,4-cyclohexylene, octamethylene, 1-methyl-1,7-heptylene, 3-methyl-1,7-heptylene, 4-methyl-1,7-heptylene, 2-methyl-1,7-heptylene, 5-methyl-1,7-heptylene, 6-methyl-1,7-heptylene, 2-ethyl-1,6-hexylene, 3-ethyl-1,6-hexylene, 4-ethyl-1,6-hexylene, 5-ethyl-1,6-hexylene, nonylmethylene, decylmethylene, undecylmethylene, and dodecylmethylene; more preferably methylene, ethylene, trimethylene, 1,2-propylene, tetramethylene, 2-methyl-1,2-propylene, 1,1-dimethylethylene, pentamethylene, 1-ethyl-1,3-propylene, 1-methyl-1,4-butylene, 2-methyl-1,4-butylene, 3-methyl-1,4-butylene, 2,2-dimethyl-1,3-propylene, 1,3-cyclopentylene, 1,6-hexamethylene, 1,4-cyclohexylene, heptamethylene, octamethylene, 1-methyl-1,7-heptylene, 3-methyl-1,7-heptylene, 4-methyl-1,7-heptylene, 2-methyl-1,7-heptylene, 5-methyl-1,7-heptylene, 6-methyl-1,7-heptylene, 2-ethyl-1,6-hexylene, 3-ethyl-1,6-hexylene, 4-ethyl-1,6-hexylene, 5-ethyl-1,6-hexylene, nonylmethylene, decylmethylene, undecylmethylene, and dodecylmethylene; even more preferably methylene, ethylene, trimethylene, 1,2-propylene, tetramethylene, 2-methyl-1,2-propylene, 1,1-dimethylethylene, pentamethylene, 2,2-dimethyl-1,3-propylene, 1,3-cyclopentylene, 1,6-hexamethylene, 1,4-cyclohexylene, heptamethylene, octamethylene, 1-methyl-1,7-heptylene, 3-methyl-1,7-heptylene, 4-methyl-1,7-heptylene, 2-methyl-1,7-heptylene, 5-methyl-1,7-heptylene, 6-methyl-1,7-heptylene, 2-ethyl-1,6-hexylene, 3-ethyl-1,6-hexylene, 4-ethyl-1,6-hexylene, 5-ethyl-1,6-hexylene, nonylmethylene, decylmethylene, undecylmethylene, and dodecylmethylene.

Specific examples of the substituent containing a carbon-carbon double bond of A includes vinyl group, allyl group, isopropenyl group, 1-butenyl group, 1-pentenyl group, p-vinylphenyl group, p-isopropenylphenyl group, m-vinylphenyl group, m-isopropenylphenyl group, o-vinylphenyl group, o-isopropenylphenyl group, p-vinylbenzyl group, p-isopropenylbenzyl group, m-vinylbenzyl group, m-isopropenylbenzyl group, o-vinylbenzyl group, o-isopropenylbenzyl group, p-vinylphenylethenyl group, p-vinylphenylpropenyl group, p-vinylphenylbutenyl group, m-vinylphenylethenyl group, m-vinylphenylpropenyl group, m-vinylphenylbutenyl group, o-vinylphenylethenyl group, o-vinylphenylpropenyl group, o-vinylphenylbutenyl group, methacrylic group, acrylic group, 2-ethylacrylic group, and 2-hydroxymethylacrylic group.

Specific examples of the substituent containing an epoxy bond of A includes a glycidyl group, for example.

The above modified polyphenylene ether is obtained, for example, by copolymerizing a monohydric phenolic compound represented by the following Formula (6)' and an a-hydric phenolic compound (central phenol) represented by the following Formula (7)', followed by a modification reaction.

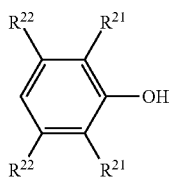

Formula (6)'

(In the above Formula (6)', $R^{21}$ and $R^{22}$ may be groups similar to the corresponding groups in the above Formula (4)', and are preferably the same as the corresponding ones in the above Formula (4)').

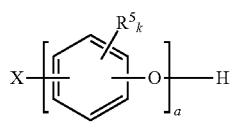

Formula (7)'

(In the above Formula (7)', X, $R^5$, and a may be similar to the corresponding ones in the above Formula (2)', and are preferably the same as the corresponding ones in the above Formula (2)'. The a partial structures bonded to X may be the same or different, but are preferably the same).

Examples of the monohydric phenolic compound expressed by Formula (6)' include o-cresol, 2,6-dimethylphenol, 2-ethylphenol, 2-methyl-6-ethylphenol, 2,6-diethylphenol, 2-n-propylphenol, 2-ethyl-6-n-propylphenol, 2-methyl-6-chlorophenol, 2-methyl-6-bromophenol, 2-methyl-6-n-propylphenol, 2-ethyl-6-bromophenol, 2-methyl-6-n-butylphenol, 2,6-di-n-propylphenol, 2-ethyl-6-chlorophenol, 2-methyl-6-phenylphenol, 2-phenylphenol, 2,6-diphenylphenol, 2,6-bis-(4-fluorophenyl)phenol, 2-methyl-6-tolylphenol, 2,6-ditolylphenol, 2,5-dimethylphenol, 2,3,6-trimethylphenol, 2,5-diethylphenol, 2-methyl-5-ethylphenol, 2-ethyl-5-methylphenol, 2-allyl-5-methylphenol, 2,5-diallylphenol, 2,3-diethyl-6-n-propylphenol, 2-methyl-5-chlorophenol, 2-methyl-5-bromophenol, 2-methyl-5-isopropylphenol, 2-methyl-5-n-propylphenol, 2-ethyl-5-bromophenol, 2-methyl-5-n-butylphenol, 2,5-di-n-propylphenol, 2-ethyl-5-chlorophenol, 2-methyl-5-phenylphenol, 2,5-diphenylphenol, 2,5-bis-(4-fluorophenyl)phenol, 2-methyl-5-tolylphenol, 2,5-ditolylphenol, 2,6-dimethyl-3-allylphenol, 2,3,6-triallylphenol, 2,3,6-tributylphenol, 2,6-di-n-butyl-3-methylphenol, 2,6-dimethyl-3-n-butylphenol, and 2,6-dimethyl-3-t-butylphenol, for example.

Among these monohydric phenolic compounds, 2,6-dimethylphenol, 2,6-diethylphenol, 2,6-diphenylphenol, 2,3,6-trimethylphenol, and 2,5-dimethylphenol are preferable, and 2,6-dimethylphenol and 2,3,6-trimethylphenol are more preferable, particularly due to their low cost and availability.

One phenolic compound may be used individually, or two or more phenolic compounds may be used in combination.

As the monohydric phenolic compounds, for example, a method in which a combination of 2,6-dimethylphenol and 2,6-diethylphenol is used, a method in which a combination of 2,6-dimethylphenol and 2,6-diphenylphenol is used, a method in which a combination of 2,3,6-trimethylphenol and 2,5-dimethylphenol is used, or a method in which a combination of 2,6-dimethylphenol and 2,3,6-trimethylphenol is used may be adopted. In this case, the mixture ratio of different types of the phenolic compound may be selected as appropriate.

The phenolic compound that is used may contain a small amount of m-cresol, p-cresol, 2,4-dimethylphenol, 2,4,6-trimethylphenol, or the like which may be contained as a by-product upon production.

An a-hydric phenolic compound such as one represented by Formula (7)' can be produced in an industrially advantageous manner through reaction of a corresponding monohydric phenolic compound and an aldehyde (for example, formaldehyde), a ketone (for example, acetone, methyl ethyl ketone, methyl isobutyl ketone, acetophenone, or cyclohexanone), or a dihalogenated aliphatic hydrocarbon, or through reaction of corresponding monohydric phenolic compounds with one another.

Examples of the polyhydric phenolic compound represented by the above Formula (7)' are listed below.

Examples include, but are not limited to: 4,4'-[(3-hydroxyphenyl)methylene]bis(2,6-dimethylphenol), 4,4'-[(3-hydroxyphenyl)methylene]bis(2,3,6-trimethylphenol), 4,4'-[(4-hydroxyphenyl)methylene]bis(2,6-dimethylphenol), 4,4'-[(4-hydroxyphenyl)methylene]bis(2,3,6-trimethylphenol), 4,4'-[(2-hydroxy-3-methoxyphenyl)methylene[bis(2,6-dimethylphenol), 4,4'-[(4-hydroxy-3-ethoxyphenyl)methylene]bis(2,3,6-trimethyl-ethyl phenol), 4,4'-[(3,4-dihydroxyphenyl)methylene]bis(2,6-dimethylphenol), 4,4'-[(3,4-dihydroxyphenyl)methylene]bis(2,3,6-trimethylphenol), 2,2'-[(4-hydroxyphenyl)methylene]bis(3,5,6-trimethylphenol), 4,4'-[4-(4-hydroxyphenyl)cyclohexylidene]bis(2,6-dimethylphenol), 4,4'-[(2-hydroxyphenyl)methylene]-bis(2,3,6-trimethylphenol), 4,4'-[1-[4-[1-(4-hydroxy-3,5-dimethylphenyl)-1-methylethyl]phenyl]ethylidene]bis(2,6-dimethylphenol), 4,4'-[1-[4-[1-(4-hydroxy-3-fluorophenyl)-1-methylethyl]phenyl]ethylidene]bis(2,6-dimethylphenol), 2,6-bis[(4-hydroxy-3,5-dimethylphenyl)ethyl]-4-methylphenol, 2,6-bis[(4-hydroxy-2,3,6-trimethylphenyl)methyl]-4-methylphenol, 2,6-bis[(4-hydroxy-3,5,6-trimethylphenyl)methyl]-4-ethylphenol, 2,4-bis[(4-hydroxy-3-methylphenyl)methyl]-6-methylphenol, 2,6-bis[(4-hydroxy-3-methylphenyl)methyl]-4-methylphenol, 2,4-bis[(4-hydroxy-3-cyclohexylphenyl)methyl]-6-methylphenol, 2,4-bis[(4-hydroxy-3-methylphenyl)methyl]-6-cyclohexylphenol, 2,4-bis[(2-hydroxy-5-methylphenyl)methyl]-6-cyclohexylphenol, 2,4-bis[(4-hydroxy-2,3,6-trimethylphenyl)methyl]-6-cyclohexylphenol, 3,6-bis[(4-hydroxy-3,5-dimethylphenyl)methyl]-1,2-benzenediol, 4,6-bis[(4-hydroxy-3,5-dimethylphenyl)methyl]-1,3-benzenediol, 2,4,6-tris[(4-hydroxy-3,5-dimethylphenyl)methyl]-1,3-benzenediol, 2,4,6-tris[(2-hydroxy-3,5-dimethylphenyl)methyl]-1,3- benzenediol, 2,2'-methylenebis[6-[(4/2-hydroxy-2,5/3,6-dimethylphenyl)methyl]-4-methylphenol], 2,2'-methylenebis[6-[(4-hydroxy-3,5-dimethylphenyl)methyl]-4-meth ylphenol], 2,2'-methylenebis[6-[(4/2-hydroxy-2,3,5/3,4,6-trimethylphenyl)methy 1]-4-methylphenol], 2,2'-methylenebis[6-[(4-hydroxy-2,3,5-trimethylphenyl)methyl]-4-methylphenol], 4,4'-methylenebis[2-[(2,4-dihydroxyphenyl)methyl]-6-methylphenol, 4,4'-methylenebis[2-[(2,4-dihydroxyphenyl)methyl]-3,6-dimethylphenol], 4,4'-methylenebis[2-[(2,4-dihydroxy-3-methylphenyl)methyl]-3,6-dim ethylphenol], 4,4'-methylenebis[2-[(2,3,4-trihydroxyphenyl)methyl]-3,6-dimethylphenol], 6,6'-methylenebis[4-[(4-hydroxy-3,5-dimethylphenyl)methyl]-1,2,3-benzenetriol, 1,1-bis(2-methyl-4-hydroxy-5-t-butylphenyl)butane, 4,4'-cyclohexylidenebis[2-cyclohexyl-6-[(2-hydroxy-5-methylphenyl)methyl]phenol], 4,4'-cyclohexylidenebis[2-cyclohexyl-6-[(4-hydroxy-3,5-dimethylphenyl)methyl]phenol], 4,4'-cyclohexylidenebis[2-cyclohexyl-6-[(4-hydroxy-2-methyl-5-cyclohexylphenyl)methyl]phenol], 4,4'-cyclohexylidenebis[2-cyclohexyl-6-[(2,3,4-trihydroxyphenyl)methyl]phenol], 4,4',4",4'''-(1,2-ethanediylidene)tetrakis(2,6-dimethylphenol), 4,4',4",4"'-(1,4-phenylenedimethylidene)tetrakis(2,6-dimethylphenol), and 1,1,3-tris-(2-methyl-4-hydroxy-5-tert-biphenylphenyl).

Although the number of phenolic hydroxy groups in the polyhydric phenolic compound is not specifically limited so long as there are at least 2 phenolic hydroxy groups, a larger number of polyphenylene ether terminals may result in a large change in molecular weight upon heating. Therefore, the number of phenolic hydroxy groups is preferably 3 to 6, and more preferably 3 or 4.

Particularly preferred polyhydric phenolic compounds are 4,4'-[(4-hydroxyphenyl)methylene]bis(2,6-dimethylphenol), 4,4'-[(3-hydroxyphenyl)methylene]bis(2,6-dimethylphenol), 4,4'-[(4-hydroxyphenyl)methylene]bis(2,3,6-trimethylphenol), 4,4'-[(3-hydroxyphenyl)methylene]bis(2,3,6-trimethylphenol), 4,4',4",4'''-(1,4-phenylenedimethylidene)tetrakis(2,6-dimethylphenol), 1,1,3-tris-(2-methyl-4-hydroxy-5-tert-butylphenyl)butane, and 1,1-bis(2-methyl-4-hydroxy-5-t-butylphenyl)butane.

In the modified polyphenylene ether composition of the present embodiment, a modified polyphenylene ether having a structure of the above Formula (1)', a modified polyphenylene ether in which one or more (—$Y_n$-A) are (—$Y_n$—H) and not all (—$Y_n$-A) are (—$Y_n$—H) in the structure of the above Formula (1)', and a polyphenylene ether in which all (—$Y_n$-A) are (—$Y_n$—H) in the structure of the above Formula (1)' is contained, as a total amount of these compounds, in an amount of 60 mol % or more, preferably 70 mol % or more, more preferably 80 mol % or more, and even more preferably 90 mol % or more, with respect to the sum of the moles (100 mol %) of a monofunctional polyphenylene ether represented by the following Formula (8)', a terminally-modified product of a monofunctional polyphenylene ether represented by the following Formula (8)', a bifunctional polyphenylene ether represented by the following Formula (9)', a terminally-modified product of a bifunctional polyphenylene ether represented by the following Formula (9)', the modified polyphenylene ether having a structure of the above Formula (1)', the modified polyphenylene ether in which one or more (—$Y_n$-A) are (—$Y_n$—H) and not all (—$Y_n$-A) are (—$Y_n$—H) in the structure of the above Formula (1)', and the polyphenylene ether in which all (—$Y_n$-A) are (—$Y_n$—H) in the structure of the above Formula (1)'.

The modified polyphenylene ether composition of the present embodiment may contain by-products generated when a modified polyphenylene ether having a structure of the above Formula (1)' is produced.

Examples of such by-products include a monofunctional polyphenylene ether represented by the following Formula (8)', a terminally-modified product of a monofunctional polyphenylene ether represented by the following Formula (8)', a bifunctional polyphenylene ether having a central biphenyl structure represented by the following Formula (9)', a terminally-modified product of a bifunctional polyphenylene ether represented by the following Formula (9)', a modified polyphenylene ether in which one or more (—$Y_n$-A) are (—$Y_n$—H) and not all (—$Y_n$-A) are (—$Y_n$—H) in the structure of the above Formula (1)', and a polyphenylene ether in which all (—$Y_n$-A) are (—$Y_n$—H) in the structure of the above Formula (1)'.

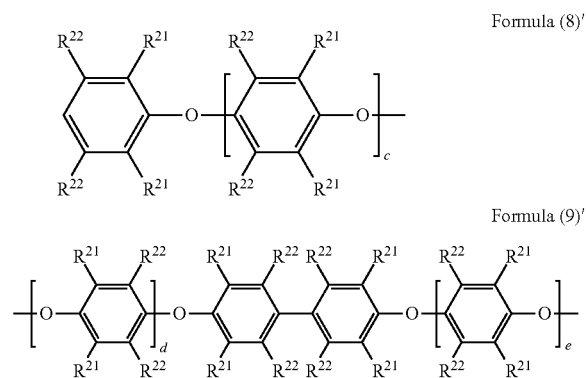

In the above Formulae (8)' and (9)', c, d, and e are each an arbitrary integer from 1 to 100. $R^{21}$ and $R^{22}$ may be similar to, and are preferably the same as the corresponding ones in the above Formula (4)'.

The monofunctional polyphenylene ether represented by the above Formula (8)' is a by-product generated by oxidative polymerization of a monohydric phenolic compound having the structure of the above Formula (6)'. Further, the bifunctional polyphenylene ether having a central biphenyl structure represented by the above Formula (9)' is a by-product generated by oxidative polymerization of a biphenyl compound generated by C—C coupling of monohydric phenolic compounds having a structure of the above Formula (6)' and another monohydric phenolic compound. The modified polyphenylene ether composition of the present embodiment may contain by-products which are generated by terminal modification of the above-described by-products.

In the modified polyphenylene ether composition, when a content ratio of a modified polyphenylene ether having a structure of the above Formula (1)', a modified polyphenylene ether in which one or more (—$Y_n$-A) are (—$Y_n$—H) and not all (—$Y_n$-A) are (—$Y_n$—H) in the structure of the above Formula (1)', and a polyphenylene ether in which all (—$Y_n$-A) are (—$Y_n$—H) in the structure of the above Formula (1)' is 60 mol % or more, by-products (e.g., by-products having a structure represented by the above formula (8)' or (9)') is reduced relative to the polyfunctional polyphenylene ether component. As a result, properties as a modified polyphenylene ether composition, particularly a long-term solubility in a solvent and a low viscosity when being dissolved in a solvent, are achieved.

In the modified polyphenylene ether composition of the present embodiment, a polyfunctional polyphenylene ether serving as a raw material of a polyfunctional modified polyphenylene ether having a structure of the above Formula (1)' can also be produced by a redistribution reaction in which a monofunctional polyphenylene ether is equilibrated with a polyhydric phenol in the presence of an oxidizing agent. Redistribution reactions are well-known in the art, and are disclosed, for example, in U.S. Pat. No. 3,496,236 B to Cooper et al. and U.S. Pat. No. 5,880,221 B to Liska et al.

However, in production of a polyfunctional modified polyphenylene ether composition using a redistribution reaction, peroxides are often used as a reaction initiator and an oxidizing agent. However, peroxides are highly reactive and produce various by-products. One representative example of by-products thereof is a peroxide adduct to the polyphenylene ether which is produced. Further, by-products through addition of a peroxide to not only a polyfunctional polyphenylene ether which is the target product but also to a monofunctional polyphenylene ether or a polyhydric phenol which are the raw materials are generated. As a result, the purity of the polyfunctional modified polyphenylene ether or the like having the structure of the above Formula (1)' which is the target product would decrease.

Whether by-products produced through addition of peroxides is present or not can be determined by a $^1$H-NMR measurement. In a $^1$H-NMR measurement result, the peroxide-derived peak appears in a wide range, among which a region of 7.6 to 8.3 ppm does not overlap with peaks derived from the phenolic raw material or the polyphenylene ether composition.

In the modified polyphenylene ether composition of the present embodiment, the ratio of the integrated value of the peak derived from the peroxide appearing in the region of 7.6 to 8.3 ppm described above, to the integrated value of the peak derived from the central phenol site represented by the above Formula (2)' contained in a modified polyphenylene ether having a structure of the above Formula (1)', a modified polyphenylene ether in which one or more (—$Y_n$-A) are (—$Y_n$—H) and not all (—$Y_n$-A) are (—$Y_n$—H) in the structure of the above Formula (1)', and a polyphenylene ether in which all (—$Y_n$-A) are (—$Y_n$—H) in the structure of the above Formula (1)' is 1 or less, and preferably 0.8 or less, and more preferably 0.5 or less. The ratio of the integrated value of the peroxide-derived peak being 1 or less to the integrated value of the peak derived from the center phenol site described above means that no by-produced peroxide adduct is not contained in the modified polyphenylene ether composition and the purity of the polyfunctional modified polyphenylene ether or the like of the target product is high. As a result, the glass transition temperature (Tg) of the modified polyphenylene ether composition can be increased.

This ratio can be measured by using the method described in the Examples section below.

The number average molecular weight (Mn) of the modified polyphenylene ether composition in the present embodiment is from 500 to 15,000 g/mol, preferably from 1,000 to 10,000 g/mol, and more preferably from 2,000 to 8,000 g/mol. When the number average molecular weight (Mn) is within any of the above ranges, the fluidity when being dissolved in a solvent for preparing a varnish in the application step to a substrate material is further improved and the workability upon application to the substrate material can be assured.

The number average molecular weight can be measured by using the method described in the Examples section below.

The number of A substituents contained in the polyfunctional modified polyphenylene ether composition in the present embodiment is not particularly limited. Among them, the number of A substituents contained in the composition is preferably from 700 to 3000 μmol/g, and more preferably from 700 to 2000 μmol/g. When the number of A substitutes in the composition is 700 μmol/g or more, the crosslinking density can be increased upon thermosetting, and a cured product having a high glass transition temperature and excellent dielectric characteristics tends to be obtained. When the number of A substitutes in the composition is 3000 μmol/g or less, the viscosity of a varnish prepared by dissolving the modified polyphenylene ether composition in a solvent can be reduced and a good workability tends to be achieved upon application to a substrate material.

As a method of evaluating the number of A substitutes, a well-known method, such as titration, spectroscopy, or quantitative NMR, can be used according to the type of functional group. For example, in the quantitative NMR, in the case where $^1$H-NMR is used, the polyfunctional modified polyphenylene ether composition is measured in the presence of a standard sample having a known structure. The polyfunctional modified polyphenylene ether composition having a known weight and the standard sample are dissolved in a deuterated solvent followed by $^1$H-NMR measurement. The number of A substitutes can be calculated from the ratio of the integrated values of the peak derived from A and the peak of the standard sample, the weight of the polyfunctional modified polyphenylene ether composition, the weight of the standard sample, and the molecular weight of the standard sample. The standard sample is not particularly limited as long as it is dissolved in a deuterated solvent, does not react with the polyfunctional modified polyphenylene ether composition, and the peaks of $^1$H-NMR do not interfere with the peaks derived from the polyfunctional modified polyphenylene ether composition.

The liquid viscosity of the modified polyphenylene ether composition of the present embodiment is preferably less than 35 mPa·s, more preferably 30 mPa·s or less, and even more preferably 28 mPa·s or less.

The liquid viscosity can be measured by using the method described in the Examples section below.

Because the polyfunctional modified polyphenylene ether composition in the present embodiment is preferably heated to at least a temperature for drying a varnish and a temperature applied for thermosetting the varnish composition upon production of a substrate material, the glass transition temperature thereof is preferably 120° C. or higher, and more preferably 140° C. or higher.

<Production Method of Polyfunctional Modified Polyphenylene Ether Composition>

The polyfunctional modified polyphenylene ether composition of the present embodiment can be produced, for example, by a production method including synthesizing a polyfunctional polyphenylene ether composition having a hydroxyl group as at a terminal of the molecule, which is represented by the following Formula (1)" (hereinafter, also referred to as an unmodified polyfunctional polyphenylene ether composition) by a polymerization method, for example, and introducing an A substituent in Formula (1)' at the terminal, in other words, modifying the composition.

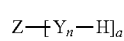 Formula (1)″

(In Formula (1)″, Z, $Y_n$, and a are similar to, and are preferably the same as the corresponding ones in Formula (1)'.)

(Polymerization Step)

Here, in a production method of the unmodified polyfunctional polyphenylene ether composition, it is preferable to use an aromatic solvent which is a good solvent of the unmodified polyfunctional polyphenylene ether composition as a polymerization solvent in a polymerization step.

Here, a good solvent of the unmodified polyfunctional polyphenylene ether composition refers to a solvent capable of dissolving the polyfunctional polyphenylene ether, and examples of such a solvent include aromatic hydrocarbons such as benzene, toluene, xylene (including o-, m-, and p-isomers), ethylbenzene, and styrene; halogenated hydrocarbons such as chlorobenzene and dichlorobenzene; and nitro compounds such as nitrobenzene, for example.

As the polymerization catalyst used in the present embodiment, well-known catalyst systems which can be generally used for production of polyphenylene ethers can be used. Catalyst systems composed of a transition metal ion having oxidation-reduction capability and an amine compound capable of forming a complex with the transition metal ion are well known, and examples thereof include a catalyst system composed of a copper compound and an amine compound, a catalyst system composed of a manganese compound and an amine compound, and a catalyst system composed of a cobalt compound and an amine compound, for example. Because the polymerization reaction proceeds efficiently under a slight alkaline condition, a small amount of an alkaline or an additional amine compound may be added in the system.

The polymerization catalyst used in the present embodiment is preferably a catalyst composed of a copper compound, a halogen compound, and an amine compound as the components of the catalyst, and more preferably a catalyst containing a diamine compound represented by the general formula (10)' as the amine compound.

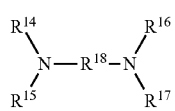 Formula (10)'

In Formula (10)', $R_{14}$, $R_{15}$, $R_{16}$, and $R_{17}$ are each independently a hydrogen atom or a linear or branched alkyl group having a carbon number of 1 to 6. However, $R^{14}$, $R^{15}$, $R^{16}$, and $R^{17}$ cannot be all hydrogen atoms. $R^{18}$ is an alkylene group having a carbon number of 2 to 5 which is linear or has a methyl branch.

Examples of the copper compound as the component of the catalyst described herein are listed. The preferred copper compound that can be used may be a cuprous compound, a cupric compound or a mixture thereof. Examples of the cupric compound include cupric chloride, cupric bromide, cupric sulfate, and cupric nitrate. Examples of the cuprous compound include cuprous chloride, cuprous bromide, cuprous sulfate, and cuprous nitrate. Among these metal compounds, cuprous chloride, cupric chloride, cuprous bromide, and cupric bromide are particularly preferable. Copper salts of these may be synthesized from an oxide (for example, cuprous oxide), carbonate, hydroxide, or the like and a corresponding halogen or acid at the time of use. A frequently used method includes preparing a mixture of a cuprous oxide and a hydrogen halide (or a solution of the hydrogen halide) as exemplified above in advance.

Examples of the halogen compound include hydrogen chloride, hydrogen bromide, hydrogen iodide, sodium chloride, sodium bromide, sodium iodide, potassium chloride, potassium bromide, potassium iodide, tetramethylammonium chloride, tetramethylammonium bromide, tetramethylammonium iodide, tetraethylammonium chloride, tetraethylammonium bromide, and tetraethylammonium iodide, for example. These may be used in the form of an aqueous solution or a solution with an appropriate solvent. These halogen compounds may be used alone or in combination of two or more as the component. A preferred halogen compound is an aqueous solution of hydrogen chloride or an aqueous solution of hydrogen bromide.

The amount of these compounds to be used is not particularly limited, but the amount of halogen atoms is preferably 2 times or more and 20 times or less of the molar amount of copper atoms, and the amount of the copper atoms to be used is preferably in the range of 0.02 mol to 0.6 mol with respect to 100 mol of the phenolic compound to be added in the polymerization reaction.

Next, examples of the diamine compound as the component of the catalyst are listed. Examples include N,N,N',N'-tetramethylethylenediamine, N,N,N'-trimethylethylenediamine, N,N'-dimethylethylenediamine, N,N-dimethylethylenediamine, N-methylethylenediamine, N,N,N',N'-tetraethylethylenediamine, N,N,N'-triethylethylenediamine, N,N'-diethylethylenediamine, N,N-diethylethylenediamine, N-ethylethylenediamine, N,N-dimethyl-N'-ethylethylenediamine, N,N'-dimethyl-N-ethylethylenediamine, N-n-propylethylenediamine, N,N'-n-propylethylenediamine, N-i-propylethylenediamine, N,N'-i-propylethylenediamine, N-n-butylethylenediamine, N,N'-n-butylethylenediamine, N-i-butylethylenediamine, N,N'-i-butylethylenediamine, N-t-butylethylenediamine, N,N'-t-butylethylenediamine, N,N,N',N'-tetramethyl-1,3-diaminopropane, N,N,N'-trimethyl-1,3-diaminopropane, N,N'-dimethyl-1,3-diaminopropane, N-methyl-1,3-diaminopropane, N,N,N',N'-tetramethyl-1,3-diamino-1-methylpropane, N,N,N',N'-tetramethyl-1,3-diamino-2-methylpropane, N,N,N',N'-tetramethyl-1,4-diaminobutane, and N,N,N',N'-tetramethyl-1,5-diaminopentane, for example. Preferred diamine compounds for the present embodiment are those in which the alkylene group connecting two nitrogen atoms has a carbon number of 2 or 3. Although the amount of such a diamine compound that is used is not specifically limited, the amount is preferably in a range of 0.01 mol to 10 mol with respect to 100 mol of the phenolic compound to be added in the polymerization reaction.

In the present embodiment, a primary amine and a secondary monoamine may be included as components of the polymerization catalyst. Examples of the secondary monoamine include, but are not limited to, dimethylamine, diethylamine, di-n-propylamine, di-i-propylamine, di-n-butylamine, di-i-butylamine, di-t-butylamine, dipentylamines, dihexylamines, dioctylamines, didecylamines, dibenzylamines, methylethylamine, methylpropylamine, methylbutylamine, cyclohexylamine, N-phenylmethanolamine, N-phenylethanolamine, N-phenylpropanolamine, N-(m- methylphenyl)ethanolamine, N-(p-methylphenyl)ethanolamine, N-(2',6'-dimethylphenyl)ethanolamine, N-(p-chlorophenyl)ethanolamine, N-ethylaniline, N-butylaniline, N-methyl-2-methylaniline, N-methyl-2,6-dimethylaniline, and diphenylamine, for example.

A tertiary monoamine compound may also be included as a component of the polymerization catalyst in the present embodiment. A tertiary monoamine compound refers to an aliphatic tertiary amine, inclusive of an alicyclic tertiary amine. Examples thereof include trimethylamine, triethylamine, tripropylamine, tributylamine, triisobutylamine, dimethylethylamine, dimethylpropylamine, allyldiethylamine, dimethyl-n-butylamine, diethylisopropylamine, and N-methylcyclohexylamine, for example. These tertiary monoamines may be used alone or in combination of two or more. The amount thereof to be used is not particularly limited, but is preferably in a range of 15 mol or less with respect to 100 mol of the phenolic compound to be added to the polymerization reaction.

In the present embodiment, there is no limitation on addition of a surfactant which is conventionally known to have an effect of enhancing polymerization activity. The surfactant may, for example, be trioctylmethylammonium chloride known by the product names Aliquat 336 and CapRiquat. The amount thereof to be used is preferably within a range not exceeding 0.1% by mass with respect to 100% by mass of the total amount of the polymerization reaction mixture.

Examples of oxygen-containing gases for polymerization of the present embodiment include pure oxygen, a mixture of oxygen and an inert gas such as nitrogen in any ratio, air, and a mixture of air and an inert gas such as nitrogen in any ratio, for example. It is suffice that the internal pressure during the polymerization reaction is normal pressure, but a reduced pressure or an increased pressure may be used if necessary.

The temperature of the polymerization is not particularly limited, but is in the range of 0 to 60° C., preferably 10 to 50° C., because the reaction becomes difficult to proceed when the temperature it is too low, whereas the reaction selectivity may be reduced and high molecular weight components may be generated when it is too high.

In the production method of the unmodified polyfunctional polyphenylene ether composition of the present embodiment, polymerization is preferably performed in a solution state upon polymerization of polyphenylene ether (such a polymerization is herein also referred to as "solution polymerization"). By production by means of solution polymerization, even when the central phenol has a bulky structure, the ratios of generation of a polyphenylene ether component which does not contain the structure of the above Formula (1)" during production of the unmodified polyfunctional polyphenylene ether composition or by-products generated from peroxides are reduced, and a polyfunctional modified polyphenylene ether or the like containing the structure of the above Formula (1)' of the target product can be produced with a high purity.

(Copper Extraction and by-Product Removal Step)

In the present embodiment, there is no particular limitation on the post-treatments after the polymerization reaction is completed. Typically, an acid such as hydrochloric acid or acetic acid, or ethylenediaminetetraacetic acid (EDTA) and a salt thereof, nitrilotriacetic acid and a salt thereof, or the like is added to the reaction solution for deactivating the catalyst. Further, by-produced dihydric phenol products generated by polymerization of polyphenylene ether can be removed using a conventional well-known method. In the case where metal ions serving as the catalyst have been substantially deactivated as described above, the mixture is decolorized only by heating. A method in which a required amount of a well-known reducing agent is added is also employed. Examples of the well-known reducing agent include hydroquinone and sodium dithionite, for example.

(Liquid-Liquid Separation Step)

In the production method of the unmodified polyfunctional polyphenylene ether composition of the present embodiment, water may be added to extract the compound in which the copper catalyst has been deactivated, followed by liquid-liquid separation between the organic phase and the aqueous phase, and the aqueous phase is then separated from the organic phase to remove the copper catalyst. Examples of this liquid-liquid separation step include, but are not particularly limited to, settled separation and separation by a centrifuge. A well-known surfactant or the like may be employed for promoting the liquid-liquid separation described above.

(Concentration and Drying Step)

Subsequently, in the production method of the polyfunctional modified polyphenylene ether composition of the present embodiment, an organic phase containing the unmodified polyfunctional polyphenylene ether composition obtained after the liquid-liquid separation may be concentrated and dried by volatilizing the solvent. Note that this step may be omitted in the case where a modification reaction (a reaction to introduce a substituent A in Formula (1)' into a terminal of the unmodified polyfunctional polyphenylene ether composition) is subsequently performed.

Examples of the method of volatilizing the solvent contained in the organic phase include, but are not particularly limited to, a method in which the organic phase is transferred to a concentration tank set to a high temperature to distill off the solvent for concentration, and a method in which toluene is distilled off using an instrument such as a rotary evaporator for concentration.

The temperature of drying in the drying step is preferably at least 60° C. or higher, more preferably 80° C. or higher, even more preferably 120° C. or higher, and most preferably 140° C. or higher. Drying of the polyfunctional polyphenylene ether composition at a temperature of at least 60° C. can efficiently reduce the content of a high boiling point volatile component in the polyphenylene ether powder.

Methods effective for obtaining an unmodified polyfunctional polyphenylene ether composition at high efficiency include raising drying temperature, increasing the degree of vacuum in a drying atmosphere, performing stirring during drying, and the like; among these, particularly preferred from the perspective of production efficiency is raising drying temperature. The drying step is preferably carried out using a dryer equipped with a mixing function. The mixing function may be implemented by a stirring-type dryer, a rolling-type dryer, or the like. This increases throughput and maintains high productivity.

[Modification Reaction Step]

There is no limitation on a method of introducing a substituent of A (e.g., a functional group of the above Formula (5)') into the terminal of the obtained unmodified polyphenylene ether, and the introduction is achieved, for example, through a reaction to form an ester bond of the hydroxyl group at the terminal of the unmodified polyphenylene ether with a carboxylic acid having a carbon-carbon double bond (hereinafter, referred to as a carboxylic acid). A wide variety of well-known methods can be utilized for forming the ester bond. Examples include a. reaction of the hydroxyl group at the terminal of the polymer with a carboxylic acid halide; b. formation of an ester bond by reaction with a carboxylic anhydride; c. direct reaction with a carboxylic acid; and d. method by transesterification, for example. Among these, a. reaction with a carboxylic acid halide is one of the most common methods. Chlorides and bromides are typically used as the carboxylic acid halide, but other halides may be utilized. The reaction may be either a direct reaction with the hydroxyl group or a reaction of an alkali metal salt of the hydroxyl group. Because an acid such as hydrogen halide is generated in a direct reaction of the hydroxyl group with a carboxylic acid halide, a weak base such as an amine may be added for the purpose of trapping the acid. In b. reaction with a carboxylic anhydride or c. direct reaction with a carboxylic acid, a compound such as carbodiimides and dimethylaminopyridine, for example, may be added for activating the reaction site to accelerate the reaction. In the case of d. transesterification reaction, it is desirable to remove produced alcohols if necessary. In addition, a well-known metal catalyst may be added for accelerating the reaction. After the reaction, washing with water or an acidic or alkaline aqueous solution may be carried out for removing by-products such as amine salts, or the polymer solution may be added dropwise into a poor solvent such as an alcohol to recover the target product by reprecipitation. In addition, after the polymer solution is washed, the solvent may be distilled off under a reduced pressure to recover the polymer.

The production method of the polyfunctional modified polyphenylene ether composition of the present embodiment is not limited to the production method of the polyfunctional modified polyphenylene ether composition of the present embodiment described above, and the order and the number of times of the polymerization step, the copper extraction and by-product removal step, the liquid-liquid separation step, and the concentration and drying step, and the like described above may be appropriately modified.

EXAMPLES

Examples of Polyfunctional Polyphenylene Ether Composition

Hereinafter, although the present embodiments will be described in more detail with reference to Examples, the present embodiments are not limited to the following Examples.

First, the following describes measurement methods and evaluation criteria for the respective physical properties and evaluations.

(1) Presence ratio of polyphenylene ether (main component polyphenylene ether) having structure of Formula (1)

(1-1) Each of polyphenylene ether compositions obtained in Examples 1 to 2 and Comparative Examples 1 to 3 and polyhydric phenols used as the raw material were dissolved in deuterochloroform, and a $^1$H-NMR (manufactured by JEOL Ltd., 500 MHz) was measured using tetramethylsilane as an internal standard.

(1-2) From the peak position attributed to the central phenol site, the peak of polyhydric phenol contained in each product was identified.

(1-3) The central phenol unit of the main component polyphenylene ether represented by Formula (2), the terminal phenoxy unit unique to by-products represented by Formula (10), and the diphenyl unit unique to by-products represented by Formula (11) were attributed to respective peaks in the obtained NMR spectrum, and the presence ratios of various polyphenylene ethers were quantified according to the following Formula (12).

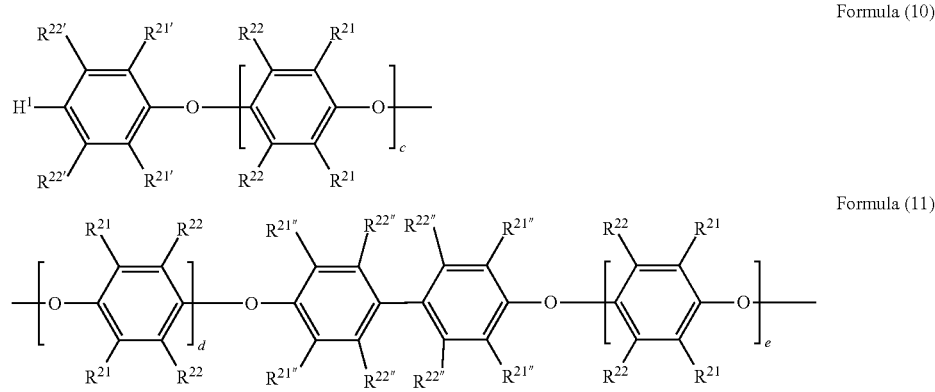

Formula (10)

Formula (11)

In Formula (10), Formula (11), c, d, and e are each an arbitrary integer from 1 to 100.

Presence ratio of main component polyphenylene ether(mol %)=$E/F/(C/3+D/4+E/F)\times 100$   Formula (12)

where C is the integrated value of the peak area attributed to $H^{11}$ and $R^{22'}$ sites of the terminal phenoxy unit unique to by-products represented by Formula (10);

D is the integrated value of the peak area attributed to $R^{22''}$ site inside the central phenol unique to by-products represented by Formula (11);

E is the integrated value of the peak area attributed to the central phenol site of the main component polyphenylene ether represented by Formula (2); and F is the number of protons derived from the central phenol site represented by Formula (2) corresponding to the peak from which the integrated value E was determined.

Note that the peak attributed to the central phenol site of the main component polyphenylene ether represented by Formula (2), the peak attributed to $H^1$ and $R^{22'}$ of the terminal phenol of by-products represented by Formula (10), and the peak attributed to $R^{22}$ inside the central phenol of by-products represented by Formula (11) used in examples and comparative examples appeared in the following regions:

1,1,3-tris(2-methyl-4-hydroxy-5-t-butylphenyl)butane (1H): 2.8 to 3.2 ppm;
1,1-bis(2-methyl-4-hydroxy-5-t-butylphenyl)butane (1H): 4.0 to 4.3 ppm;
2,2-bis(3,5-dimethyl-4-hydroxyphenyl)propane (4H): 6.95 to 7.0 ppm;
phenoxy unit at the terminal of by-products represented by Formula (10) (3H): 7.05 to 7.1 ppm; and
diphenyl in by-products represented by Formula (11) (4H): 7.34 to 7.4 ppm.

(2) Ratio of integrated value of peak appearing at 7.6 to 8.3 ppm to integrated value of peak derived from structure of Formula (2) (presence ratio of peroxide peak)

The integrated value E of the peak area attributed to the central phenol site of the main component polyphenylene ether represented by Formula (2) was determined. The integrated value G of the impurity peak area derived from the peroxide appearing in the region of 7.6 to 8.3 ppm was calculated. The presence ratio of the impurity peak was determined by substituting them into the following Formula (13).

$$\text{Presence ratio of peroxide peak} = G/E \qquad \text{Formula (13)}$$

(3) Number average molecular weight (Mn)

A calibration curve was prepared based on standard polystyrene and ethylbenzene using Gel Permeation Chromatography System 21 manufactured by Showa Denko K.K. as the measurement apparatus. The number average molecular weight (Mn) of each polyphenylene ether composition obtained was then determined using the calibration curve.

Standard polystyrene having molecular weights of U.S. Pat. Nos. 3,650,000, 2,170,000, 1,090,000, 681,000, 204,000, 52,000, 30,200, 13,800, 3,360, 1,300, and 550 was used.

Two K-805L columns produced by Showa Denko K.K. connected in series were used as the columns. Measurements were performed with a column temperature of 40° C. and using chloroform as a solvent with a solvent flow rate of 1.0 mL/min. A 1-g/L solution of each polyphenylene ether composition in chloroform was prepared and used as a measurement sample. The UV wavelength of the detector was set as 254 nm for standard polystyrene and 283 nm for polyphenylene ethers.

The number average molecular weight (Mn) (g/mol) was calculated from the ratio of the peak area based on the curve exhibiting the molecular weight distribution obtained by the GPC based on the above measured data.

(4) Glass transition temperature ($T_g$)

The glass transition temperature of each polyphenylene ether composition was measured using a differential scanning calorimeter DSC (Pyrisl manufactured by PerkinElmer). In a nitrogen atmosphere, the temperature was raised from room temperature to 200° C. at a temperature rise rate of 20° C. per minute, was lowered to 50° C. at a rate of 20° C. per minute, and was then raised at a temperature rise rate of 20° C. per minute to thereby measure the glass transition temperature.

(5) Number of OH terminals contained in composition

For each polyphenylene ether composition, 5.0 mg of the composition was weighed out. The weighed-out polyphenylene ether composition was then dissolved into 25 mL of methylene chloride. To 2.0 mL of the prepared solution, 150 µL of a 2% by mass solution of tetraethylammonium hydroxide (TEAH) in ethanol was added, and then the absorbance (Abs) at 318 nm was measured by a UV spectrophotometer (Type U-3210 manufactured by Hitachi High-Tech Science Corporation) (using an cell for absorbance measurements having a cell length of 1 cm). Based on the measurement result, the pseudo molecular weight obtained from the absorbance was then determined by the following Formula (9).

$$\text{Pseudo molecular weight(g/mol) obtained from absorbance} = [(\varepsilon \times 5)/(25 \times Abs)] \qquad \text{Formula (9)}$$

where $\varepsilon$ represents the extinction coefficient and is 4700 L/mol·cm.

Further, the number of OH terminals per 1 g of the polyphenylene ether composition (µmol/g) was calculated by multiplying the inverse of the above pseudo molecular weight by 106.

(6) Solubility in methyl ethyl ketone (MEK solubility)

For each polyphenylene ether composition, 2 g of the composition and 3 g of methyl ethyl ketone were weighed out and placed into a transparent screw tube made of glass. The mixture was stirred with a stirrer bar using a magnetic stirrer for 1 hour to achieve complete dissolution until the solution became clear to thereby prepare a 40-wt % methyl ethyl ketone solution. The solution was allowed to stand at 25° C. for 7 days. The solution was scored according to the following criteria: "Good" when the solution maintained clarity, or "Bad" when the solution became unclear.

(7) Viscosity (liquid viscosity) of toluene solution of polyphenylene ether composition For each polyphenylene ether composition, 2 g of the composition and 3 g of toluene were weighed out. The mixture was stirred with a stirrer bar using a magnetic stirrer for 1 hour to achieve complete dissolution until the solution became clear to thereby prepare a 40-wt % toluene solution. The liquid viscosity of this solution was measured using a B-type viscometer under the conditions of 25° C. and 30 rpm.

Hereinafter, a production method of a polyphenylene ether composition of each of examples and comparative examples will be described.

Example 1

A 1.5-liter jacketed reactor equipped with a sparger for the introduction of an oxygen-containing gas, stirred turbine blades and a baffle at the bottom of the reactor, as well as a refluxing condenser in the vent gas line at the top of the reactor was charged with a pre-prepared mixture of 0.1026 g of cuprous oxide and 0.7712 g of 47%-hydrogen bromide, 0.2471 g of N,N'-di-t-butylethylenediamine, 3.6407 g of dimethyl-n-butylamine, 1.1962 g of di-n-butylamine, 894.04 g of toluene, 73.72 g of 2,6-dimethylphenol, and 26.28 g of 1,1,3-tris(2-methyl-4-hydroxy-5-t-butylphenyl)butane (AO-30 manufactured by ADEKA CORPORATION). Thereafter, simultaneously with start of introduction of air from the sparger at a rate of 1.05 L/minute into the reactor under vigorous stirring, the polymerization temperature was adjusted to be kept to a temperature of 40° C. by flowing the heat medium through the jacket. The air was stopped to be introduced after 160 minutes after the start of introduction of the air, and 1.1021 g of ethylenediaminetetraacetic acid tetrasodium salt tetrahydrate (reagent manufactured by Dojindo Laboratories Co., Ltd.) was added to this polymerization mixture as 100 g of an aqueous solution. The mixture was then heated to 70° C. The temperature was maintained at 70° C. for 2 hours, and the steps of catalyst extraction and removal of by-produced diphenoquinone were carried out. Thereafter, the mixed solution was transferred to a centrifuge manufactured by Sharples, and was separated into a polyphenylene ether composition solution (organic phase) and an aqueous phase to which the catalyst metal was transferred. The resultant polyphenylene ether composition solution was transferred to a concentration tank provided with a jacket to distill off toluene for concentration until the solid content in the polyphenylene ether composition solution became 55% by mass. Subsequently, toluene was further distilled off using an oil bath and a rotary evaporator set at 230° C. for drying and solidify the solid content to obtain a polyphenylene ether composition. Table 1 lists the results of the analyses of the resultant polyphenylene ether composition.

Example 2

A 1.5-liter jacketed reactor equipped with a sparger for the introduction of an oxygen-containing gas, stirred turbine blades and a baffle at the bottom of the reactor, as well as a refluxing condenser in the vent gas line at the top of the reactor was charged with a pre-prepared mixture of 0.1081 g of cuprous oxide and 0.8126 g of 47%-hydrogen bromide, 0.2603 g of N,N'-di-t-butylethylenediamine, 3.8360 g of dimethyl-n-butylamine, 1.2604 g of di-n-butylamine, 893.72 g of toluene, 76.33 g of 2,6-dimethylphenol, and 23.67 g of 1,1-bis(2-methyl-4-hydroxy-5-t-butylphenyl)butane (AO-40 manufactured by ADEKA CORPORATION). Thereafter, simultaneously with start of introduction of air from the sparger at a rate of 1.05 L/minute into the reactor under vigorous stirring, the polymerization temperature was adjusted to be kept to a temperature of 40° C. by flowing the heat medium through the jacket. The air was stopped to be introduced after 160 minutes after the start of introduction of the air, and 1.1612 g of ethylenediaminetetraacetic acid tetrasodium salt tetrahydrate (reagent manufactured by Dojindo Laboratories Co., Ltd.) was added to this polymerization mixture as 100 g of an aqueous solution. The mixture was then heated to 70° C. The temperature was maintained at 70° C. for 2 hours, and the steps of catalyst extraction and removal of by-produced diphenoquinone were carried out. Thereafter, the mixed solution was transferred to a centrifuge manufactured by Sharples, and was separated into a polyphenylene ether composition solution (organic phase) and an aqueous phase to which the catalyst metal was transferred. The resultant polyphenylene ether composition solution was transferred to a concentration tank provided with a jacket to distill off toluene for concentration until the solid content in the polyphenylene ether composition solution became 55% by mass. Subsequently, toluene was further distilled off using an oil bath and a rotary evaporator set at 230° C. for drying and solidify the solid content to obtain a polyphenylene ether composition. Table 1 lists the results of the analyses of the resultant polyphenylene ether composition.

Comparative Example 1

A Dimroth condenser fitted with a three-way cock and an isobaric drip funnel were attached to a three-necked 500-mL flask. After nitrogen replacement of the inside of the flask, 100 g of S202A as a raw material polyphenylene ether, 200 g of toluene, and 12.8 g of 1,1,3-tris(2-methyl-4-hydroxy-5-t-butylphenyl)butane (AO-30 manufactured by ADEKA CORPORATION) were charged. A thermometer was placed in the flask, and the flask was heated to 90° C. in an oil bath under stirring with a magnetic stirrer to dissolve the raw material polyphenylene ether. As an initiator, 37.5 g of a 40%-metaxylene solution (NYPER BMT manufactured by NOF CORPORATION) of a mixture of benzoyl peroxide, benzoyl m-methylbenzoyl peroxide, and m-tolylperoxide was diluted with 87.5 g of toluene, which was charged into an isobaric dropping funnel. After the temperature in the flask was lowered to 80° C., the initiator solution was added dropwise into the flask to initiate the reaction. The initiator was added dropwise over 2 hours. After the dropwise addition, the temperature was again raised to 90° C., and stirring was continued for 4 hours. After the reaction, the polymer solution was added dropwise into methanol for reprecipitation, and the solution was filtrated to recover the polymer. Thereafter, it was dried for 3 hours at 100° C. under vacuum. Table 1 lists the results of the analyses of the resultant polyphenylene ether composition.

Comparative Example 2

A 1.5-L jacketed reactor equipped with a sparger for the introduction of an oxygen-containing gas, stirred turbine blades and a baffle at the bottom of the reactor, as well as a refluxing condenser in the vent gas line at the top of the reactor was charged with 0.04 g of cupric chloride dihydrate, 0.19 g of 35%-hydrochloric acid, 1.70 g of N,N,N',N'-tetramethylpropanediamine, 718.0 g of methanol, 21.0 g of 2,6-dimethylphenol, and 59.0 g of 1,1,3-tris(2-methyl-4-hydroxy-5-t-butylphenyl)butane (AO-30 manufactured by ADEKA CORPORATION). Thereafter, simultaneously with start of introduction of air from the sparger at a rate of 1.05 L/minute into the reactor under vigorous stirring, the polymerization temperature was adjusted to be kept to a temperature of 40° C. by flowing the heat medium through the jacket. The polymerization solution gradually turned into the form of slurry.

The oxygen-containing air was stopped to be introduced after 120 minutes after the start of introduction of oxygen, and a 50% aqueous solution in which 0.23 g of ethylenediaminetetraacetic acid tripotassium salt (reagent manufactured by Dojindo Laboratories Co., Ltd.) was dissolved was added to this polymerization mixture. The reaction was carried out at 60° C. for 2 hours. After completion of the reaction, the mixture was filtered and washed 3 times with a methanol washing liquid (b) in an amount such that the mass ratio (b/a) of the washing liquid (b) to the polyphenylene ether composition (a) to be washed was 4 to obtain a wet polyphenylene ether composition. Subsequently, the mixture was vacuum dried at 120° C. for 1 hour to obtain a dry polyphenylene ether composition. Table 1 lists the results of the analyses of the resultant polyphenylene ether composition.

Comparative Example 3

A 1.5-liter jacketed reactor equipped with a sparger for the introduction of an oxygen-containing gas, stirred turbine blades and a baffle at the bottom of the reactor, as well as a refluxing condenser in the vent gas line at the top of the reactor was charged with a pre-prepared mixture of 0.1590 g of cuprous oxide and 2.2854 g of 47%-hydrogen bromide, 0.4891 g of N,N'-di-t-butylethylenediamine, 7.1809 g of dimethyl-n-butylamine, 3.3629 g of di-n-butylamine, 666.52 g of toluene, 265.6 g of 2,6-dimethylphenol, and 54.40 g 2,2-bis(3,5-dimethyl-4-hydroxyphenyl)propane. Thereafter, simultaneously with start of introduction of air from the sparger at a rate of 2.19 L/minute into the reactor under vigorous stirring, the polymerization temperature was adjusted to be kept to a temperature of 40° C. by flowing the heat medium through the jacket. The air was stopped to be introduced after 160 minutes after the start of introduction of the air, and 1.0053 g of ethylenediaminetetraacetic acid tetrasodium salt tetrahydrate (reagent manufactured by Dojindo Laboratories Co., Ltd.) was added to this polymerization mixture as 100 g of an aqueous solution. The mixture was then heated to 70° C. The temperature was maintained at 70° C. for 2 hours, and the steps of catalyst extraction and removal of by-produced diphenoquinone were carried out. Thereafter, the mixed solution was transferred to a centrifuge manufactured by Sharples, and was separated into a polyphenylene ether composition solution (organic phase) and an aqueous phase to which the catalyst metal was transferred. The resultant polyphenylene ether composition solution was transferred to a concentration tank provided with a jacket to distill off toluene for concentration until the solid content in the polyphenylene ether composition solution became 55% by mass. Subsequently, toluene was further distilled off using an oil bath and a rotary evaporator set at 230° C. for drying and solidify the solid content to obtain a polyphenylene ether composition. The main component in the resultant polyphenylene ether composition was a polymer in which 2,6-dimethylphenol was bonded to 2,2-bis(3,5-dimethyl-4-hydroxyphenyl)propane as the central phenol. The molar ratio of the polymer in which 2,6-dimethylphenol was bonded to 2,2-bis(3,5-dimethyl-4-hydroxyphenyl)propane as the central phenol with respect to the sum of the moles of monofunctional polyphenylene ether represented by Formula (7), bifunctional polyphenylene ether represented by Formula (8), and the polymer in which 2,6-dimethylphenol was bonded to 2,2-bis(3,5-dimethyl-4-hydroxyphenyl)propane as the central phenol was 93 mol %. Further, Table 1 lists the results of the analyses of the resultant polyphenylene ether composition.

The polyphenylene ether composition according to Comparative Example 2 had no impurity peak and exhibited a high Tg. However, application to a substrate material is considered to be difficult because the presence ratio of the main component polyphenylene ether was low and the long-term solubility in methyl ethyl ketone could not be assured.

Further, the polyphenylene ether composition according to Comparative Example 3 exhibited excellent physical properties regarding the presence ratio of the main component polyphenylene ether, the presence or absence of impurity peak, the number of OH terminals, Tg, and the long-term solubility in methyl ethyl ketone. However, because the liquid viscosity of the toluene solution relative to the number average molecular weight was high, the workability is considered to be inferior to the examples upon being applied to a substrate material.

Examples of Modified Polyphenylene Ether Composition

First, the following describes measurement methods and evaluation criteria for the respective physical properties and evaluations.

(1) Presence ratio of polyphenylene ethers (modified polyphenylene ether having structure of Formula (1)', modified polyphenylene ether in which one or more ($-Y_n$-A) are ($-Y_n$—H) and not all ($-Y_n$-A) are ($-Y_n$—H) in structure of Formula (1)', and polyphenylene ether in which all ($-Y_n$-A) are ($-Y_n$—H) in structure of Formula (1)' (main component polyphenylene ether)

TABLE 1

|  |  | Example 1 | Example 2 | Comp. Example 1 | Comp. Example 2 | Comp. Example 3 |
|---|---|---|---|---|---|---|
| Presence ratio of polyphenylene ether of structure of Formula (1) | mol % | 91 | 88 | 70 | 49 | — |
| Presence ratio of peroxide peak |  | — | 0 | 0 | 11.7 | 0 | 0 |
| Number average molecular weight | g/mol | 1644 | 1629 | 1917 | 1657 | 1582 |
| Tg | ° C. | 164 | 141 | 105 | 141 | 140 |
| Number of OH terminals | mmol/g | 1280 | 1020 | 750 | 880 | 1030 |
| MEK solubility |  | — | Good | Good | Bad | Bad | Good |
| Liquid viscosity | mPa · s | 20 | 23 | 29 | 28 | 42 |

As indicated in Table 1, in Examples 1 and 2, the polyphenylene ether compositions having a presence ratio of the main component polyphenylene ether of 60 mol % or more and a low presence ratio of the peroxide peak were obtained. Further, it has been found that the polyphenylene ether compositions according to Examples 1 to 2 had high Tg of 140° C. or higher, were also excellent in long-term solubility in methyl ethyl ketone, and the toluene solutions thereof had lower liquid viscosities compared to polymers having similar number average molecular weights, so that the workability during application of a substrate material would be excellent.

The polyphenylene ether composition according to Comparative Example 1 exhibited a presence ratio of the main component polyphenylene ether of 60 mol % or more, and the liquid viscosity of the toluene solution thereof was low. However, a lot of impurity peaks derived from peroxides were present, the long-term solubility in methyl ethyl ketone could not be assured, and the Tg was low. Application to a substrate material is therefore considered to be difficult.

(1-1) Each of modified polyphenylene ether compositions obtained in Examples and Comparative Examples, and polyhydric phenols used as the raw material were dissolved in deuterochloroform, and a $^1$H-NMR (manufactured by JEOL Ltd., 500 MHz) was measured using tetramethylsilane as an internal standard.

(1-2) From the peak position attributed to the central phenol site, the peak of polyhydric phenol contained in each product was identified.

(1-3) The central phenol unit of the main component polyphenylene ether represented by Formula (2)', the terminal phenoxy unit unique to by-products represented by Formula (11)', and the diphenyl unit unique to by-products represented by Formula (12)' were attributed to respective peaks in the obtained NMR spectrum, and the presence ratios of various polyphenylene ethers were quantified according to the following Formula (13)'.

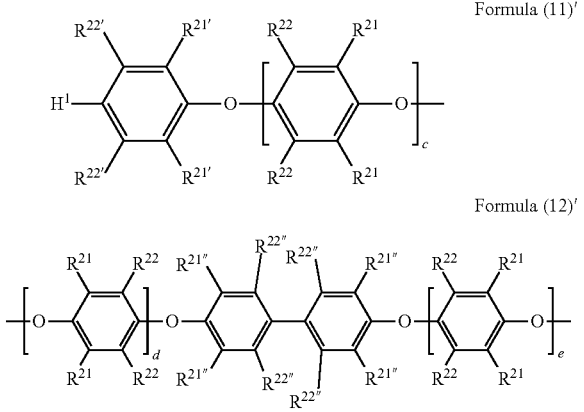

Formula (11)'

Formula (12)'

In Formula (11)' and Formula (12)', c, d, and e are each an arbitrary integer from 1 to 100.

Presence ratio of main component polyphenylene
 ether (mol %)=$E/F/(C/3+D/4+E/F) \times 100$   Formula (13)' where C is the integrated value of the peak area attributed to $H^{11}$ and $R^{22'}$ of the terminal phenoxy unit unique to by-products represented by Formula (11)';
D is the integrated value of the peak area attributed to $R^{22''}$ inside the central phenol unique to by-products represented by Formula (12)';
E is the integrated value of the peak area attributed to the central phenol site of the main component polyphenylene ether represented by Formula (2)'; and
F is the number of protons derived from the central phenol site represented by Formula (2)' corresponding to the peak from which the integrated value E was determined.

Note that the peak attributed to the central phenol site of the main component polyphenylene ether represented by Formula (2)', the peak attributed to $H^1$ and $R^{22'}$ of the terminal phenol of by-products represented by Formula (11)', and the peak attributed to $R^{22}$ inside the central phenol of by-products represented by Formula (12)' used in examples and comparative examples appeared in the following regions:
1,1,3-tris(2-methyl-4-hydroxy-5-t-butylphenyl)butane (1H): 2.8 to 3.2 ppm;
1,1-bis(2-methyl-4-hydroxy-5-t-butylphenyl)butane (1H): 4.0 to 4.3 ppm;
2,2-bis(3,5-dimethyl-4-hydroxyphenyl)propane (4H): 6.95 to 7.0 ppm;
phenoxy unit at the terminal of by-products represented by Formula (11)' (3H): 7.05 to 7.1 ppm; and
diphenyl in by-products represented by Formula (12)' (4H): 7.34 to 7.4 ppm.

(2) Ratio of integrated value of peak appearing at 7.6 to 8.3 ppm to integrated value of peak derived from structure of Formula (2)' (presence ratio of peroxide peak)

The integrated value E of the peak area attributed to the central phenol site of the main component polyphenylene ether represented by Formula (2)' was determined. The integrated value G of the impurity peak (peroxide peak) area derived from peroxide appearing in the region of 7.6 to 8.3 ppm was calculated. The presence ratio of the peroxide peak was determined by substituting them into the following Formula (14)'.

Presence ratio of impurity peak=$G/E$   Formula (14)'

(3) Number average molecular weight (Mn)

A calibration curve was prepared based on standard polystyrene and ethylbenzene using Gel Permeation Chromatography System 21 manufactured by Showa Denko K.K. as the measurement apparatus. The number average molecular weight (Mn) of each modified polyphenylene ether composition obtained was then determined using the calibration curve.

Standard polystyrene having molecular weights of U.S. Pat. Nos. 3,650,000, 2,170,000, 1,090,000, 681,000, 204,000, 52,000, 30,200, 13,800, 3,360, 1,300, and 550 was used.

Two K-805L columns produced by Showa Denko K.K. connected in series were used as the columns. Measurements were performed with a column temperature of 40° C. and using chloroform as a solvent with a solvent flow rate of 1.0 mL/min. A 1-g/L solution of each modified polyphenylene ether composition in chloroform was prepared and used as a measurement sample. The UV wavelength of the detector was set as 254 nm for standard polystyrene and 283 nm for polyphenylene ethers.

The number average molecular weight (Mn) (g/mol) was calculated from the ratio of the peak area based on the curve exhibiting the molecular weight distribution obtained by the GPC based on the above measured data.

(4) Glass transition temperature ($T_g$)

The glass transition temperature of each modified polyphenylene ether composition was measured using a differential scanning calorimeter DSC (Pyris1 manufactured by PerkinElmer). In a nitrogen atmosphere, the temperature was raised from room temperature to 200° C. at a temperature rise rate of 20° C. per minute, was lowered to 50° C. at a rate of 20° C. per minute, and was then raised at a temperature rise rate of 20° C. per minute to thereby measure the glass transition temperature.

(5) Number of A substitutes contained in composition

Predetermined amounts of a modified polyphenylene ether composition and 1,3,5-trimethoxybenzene reference standard (manufactured by FUJIFILM Wako Pure Chemical Corporation, molecular weight: 168.19) as an internal standard sample were weight out, and were dissolved in deuterochloroform containing trimethylsilane, and a $^1$H-NMR (manufactured by JEOL Ltd., 500 MHz) was measured.

Then, the integrated value of the peak (3.7 to 3.8 ppm: 9H) of the proton derived from the methoxy group in 1,3,5-trimethoxybenzene and the integrated value of the peak (5.5 to 5.9 ppm: 1H) appearing on the high magnetic field side among the protons of the terminals of the C=C bond in the methacrylic group were obtained. The number of methacrylic groups (unit: µmol/g) per 1 g of the modified polyphenylene ether composition was calculated from these integrated values and the weights of the polyphenylene ether composition and 1,3,5-trimethoxybenzene used in the measurement.

(6) Solubility in methyl ethyl ketone (MEK solubility)

For each modified polyphenylene ether composition, 2 g of the composition and 3 g of methyl ethyl ketone were weighed out and placed into a transparent screw tube made of glass. The mixture was stirred with a stirrer bar using a magnetic stirrer for 1 hour to achieve complete dissolution until the solution became clear to thereby prepare a 40-wt % methyl ethyl ketone solution. The solution was allowed to stand at 25° C. for 7 days. The solution was scored according to the following criteria: "Good" when the solution maintained clarity, or "Bad" when the solution became unclear.

(7) Viscosity (liquid viscosity) of toluene solution of modified polyphenylene ether composition For each modified polyphenylene ether composition, 2 g of the composition and 3 g of toluene were weighed out. The mixture was stirred with a stirrer bar using a magnetic stirrer for 1 hour to achieve complete dissolution until the solution became clear to thereby prepare a 40-wt % toluene solution. The liquid viscosity of this solution was measured using a B-type viscometer under the conditions of 25° C. and 30 rpm.

Hereinafter, a production method of an unmodified polyphenylene ether composition of each of production examples and comparative production examples, and a production method of a modified polyphenylene ether composition of each of the examples and the comparative examples will be described.

Production Example 1

A 1.5-liter jacketed reactor equipped with a sparger for the introduction of an oxygen-containing gas, stirred turbine blades and a baffle at the bottom of the reactor, as well as a refluxing condenser in the vent gas line at the top of the reactor was charged with a pre-prepared mixture of 0.1026 g of cuprous oxide and 0.7712 g of 47%-hydrogen bromide, 0.2471 g of N,N'-di-t-butylethylenediamine, 3.6407 g of dimethyl-n-butylamine, 1.1962 g of di-n-butylamine, 894.04 g of toluene, 73.72 g of 2,6-dimethylphenol, and 26.28 g of 1,1,3-tris(2-methyl-4-hydroxy-5-t-butylphenyl)butane (AO-30 manufactured by ADEKA CORPORATION). Thereafter, simultaneously with start of introduction of air from the sparger at a rate of 1.05 L/minute into the reactor under vigorous stirring, the polymerization temperature was adjusted to be kept to a temperature of 40° C. by flowing the heat medium through the jacket. The air was stopped to be introduced after 160 minutes after the start of introduction of the air, and 1.1021 g of ethylenediaminetetraacetic acid tetrasodium salt tetrahydrate (reagent manufactured by Dojindo Laboratories Co., Ltd.) was added to this polymerization mixture as 100 g of an aqueous solution. The mixture was then heated to 70° C. The temperature was maintained at 70° C. for 2 hours, and the steps of catalyst extraction and removal of by-produced diphenoquinone were carried out. Thereafter, the mixed solution was transferred to a centrifuge manufactured by Sharples, and was separated into an unmodified polyphenylene ether composition solution (organic phase) and an aqueous phase to which the catalyst metal was transferred. The resultant unmodified polyphenylene ether composition solution was transferred to a concentration tank provided with a jacket to distill off toluene for concentration until the solid content in the unmodified polyphenylene ether composition solution became 55% by mass. Subsequently, toluene was further distilled off using an oil bath and a rotary evaporator set at 230° C. for drying and solidify the solid content to obtain an unmodified polyphenylene ether composition.

Production Example 2

A 1.5-liter jacketed reactor equipped with a sparger for the introduction of an oxygen-containing gas, stirred turbine blades and a baffle at the bottom of the reactor, as well as a refluxing condenser in the vent gas line at the top of the reactor was charged with a pre-prepared mixture of 0.1081 g of cuprous oxide and 0.8126 g of 47%-hydrogen bromide, 0.2603 g of N,N'-di-t-butylethylenediamine, 3.8360 g of dimethyl-n-butylamine, 1.2604 g of di-n-butylamine, 893.72 g of toluene, 76.33 g of 2,6-dimethylphenol, and 23.67 g 1,1-bis(2-methyl-4-hydroxy-5-t-butylphenyl)butane (AO-40 manufactured by ADEKA CORPORATION). Thereafter, simultaneously with start of introduction of air from the sparger at a rate of 1.05 L/minute into the reactor under vigorous stirring, the polymerization temperature was adjusted to be kept to a temperature of 40° C. by flowing the heat medium through the jacket. The air was stopped to be introduced after 160 minutes after the start of introduction of the air, and 1.1612 g of ethylenediaminetetraacetic acid tetrasodium salt tetrahydrate (reagent manufactured by Dojindo Laboratories Co., Ltd.) was added to this polymerization mixture as 100 g of an aqueous solution. The mixture was then heated to 70° C. The temperature was maintained at 70° C. for 2 hours, and the steps of catalyst extraction and removal of by-produced diphenoquinone were carried out. Thereafter, the mixed solution was transferred to a centrifuge manufactured by Sharples, and was separated into an unmodified polyphenylene ether composition solution (organic phase) and an aqueous phase to which the catalyst metal was transferred. The resultant unmodified polyphenylene ether composition solution was transferred to a concentration tank provided with a jacket to distill off toluene for concentration until the solid content in the unmodified polyphenylene ether composition solution became 55% by mass. Subsequently, toluene was further distilled off using an oil bath and a rotary evaporator set at 230° C. for drying and solidify the solid content to obtain an unmodified polyphenylene ether composition.

Production Comparative Example

A Dimroth condenser fitted with a three-way cock and an isobaric drip funnel were attached to a three-necked 500-mL flask. After nitrogen replacement of the inside of the flask, 100 g of S202A as a raw material polyphenylene ether, 200 g of toluene, and 12.8 g of 1,1,3-tris(2-methyl-4-hydroxy-5-t-butylphenyl)butane (AO-30 manufactured by ADEKA CORPORATION) were charged. A thermometer was placed in the flask, and the flask was heated to 90° C. in an oil bath under stirring with a magnetic stirrer to dissolve the raw material polyphenylene ether. As an initiator, 37.5 g of a 40%-metaxylene solution (NYPER BMT manufactured by NOF CORPORATION) of a mixture of benzoyl peroxide, benzoyl m-methylbenzoyl peroxide, and m-tolylperoxide was diluted with 87.5 g of toluene, which was charged into an isobaric dropping funnel. After the temperature in the flask was lowered to 80° C., the initiator solution was added dropwise into the flask to initiate the reaction. The initiator was added dropwise over 2 hours. After the dropwise addition, the temperature was again raised to 90° C., and stirring was continued for 4 hours. After the reaction, the polymer solution was added dropwise into methanol for reprecipitation, and the solution was filtrated to recover the polymer. Thereafter, it was dried for 3 hours at 100° C. under vacuum to obtain an unmodified polyphenylene ether composition.

Production Comparative Example

A 1.5-L jacketed reactor equipped with a sparger for the introduction of an oxygen-containing gas, stirred turbine blades and a baffle at the bottom of the reactor, as well as a refluxing condenser in the vent gas line at the top of the reactor was charged with 0.04 g of cupric chloride dihydrate, 0.19 g of 35%-hydrochloric acid, 1.70 g of N,N,N',N'-tetramethylpropanediamine, 718.0 g of methanol, 21.0 g of 2,6-dimethylphenol, and 59.0 g of 1,1,3-tris(2-methyl-4-hydroxy-5-t-butylphenyl)butane (AO-30 manufactured by ADEKA CORPORATION). Thereafter, simultaneously with start of introduction of air from the sparger at a rate of 1.05 L/minute into the reactor under vigorous stirring, the polymerization temperature was adjusted to be kept to a temperature of ° C. by flowing the heat medium through the jacket. The polymerization solution gradually turned into the form of slurry.

The oxygen-containing air was stopped to be introduced after 120 minutes after the start of introduction of oxygen, and a 50% aqueous solution in which 0.23 g of ethylenediaminetetraacetic acid tripotassium salt (reagent manufactured by Dojindo Laboratories Co., Ltd.) was dissolved was added to this polymerization mixture. The reaction was carried out at 60° C. for 2 hours. After completion of the reaction, the mixture was filtered and washed 3 times with a methanol washing liquid (b) in an amount such that the mass ratio (b/a) of the washing liquid (b) to the unmodified polyphenylene ether composition (a) to be washed was 4 to obtain a wet unmodified polyphenylene ether composition. Subsequently, the mixture was vacuum dried at 120° C. for 1 hour to obtain an unmodified polyfunctional polyphenylene ether composition.

Production Comparative Example

A 1.5-liter jacketed reactor equipped with a sparger for the introduction of an oxygen-containing gas, stirred turbine blades and a baffle at the bottom of the reactor, as well as a refluxing condenser in the vent gas line at the top of the reactor was charged with a pre-prepared mixture of 0.1590 g of cuprous oxide and 2.2854 g of 47%-hydrogen bromide, 0.4891 g of N,N'-di-t-butylethylenediamine, 7.1809 g of dimethyl-n-butylamine, 3.3629 g of di-n-butylamine, 666.52 g of toluene, 265.6 g of 2,6-dimethylphenol, and 54.40 g of 2,2-bis(3,5-dimethyl-4-hydroxyphenyl)propane. Thereafter, simultaneously with start of introduction of air from the sparger at a rate of 2.19 L/minute into the reactor under vigorous stirring, the polymerization temperature was adjusted to be kept to a temperature of 40° C. by flowing the heat medium through the jacket. The air was stopped to be introduced after 160 minutes after the start of introduction of the air, and 1.0053 g of ethylenediaminetetraacetic acid tetrasodium salt tetrahydrate (reagent manufactured by Dojindo Laboratories Co., Ltd.) was added to this polymerization mixture as 100 g of an aqueous solution. The mixture was then heated to 70° C. The temperature was maintained at 70° C. for 2 hours, and the steps of catalyst extraction and removal of by-produced diphenoquinone were carried out. Thereafter, the mixed solution was transferred to a centrifuge manufactured by Sharples, and was separated into an unmodified polyphenylene ether composition solution (organic phase) and an aqueous phase to which the catalyst metal was transferred. The resultant unmodified polyphenylene ether composition solution was transferred to a concentration tank provided with a jacket to distill off toluene for concentration until the solid content in the unmodified polyphenylene ether composition solution became 55% by mass. Subsequently, toluene was further distilled off using an oil bath and a rotary evaporator set at 230° C. for drying and solidify the solid content to obtain an unmodified polyphenylene ether composition.

Example 3

A stirrer was placed in a 300-ml three-neck flask, and a Dimroth condenser to which a three-way cock was attached to the main tube and a rubber stopper through which a thermometer was inserted was attached to one side tube. From the other side tube, 20 g of the unmodified polyphenylene ether composition obtained in Production Example 1 was charged, and the other side tube was plugged with a rubber stopper. After nitrogen replacement of the inside of the flask, the composition was dissolved into 140 g of toluene provided using a syringe under stirring of the inside with a magnetic stirrer. Then, 6.32 g of triethylamine was added. Subsequently, 3.27 g of methacryloyl chloride was sucked into a syringe, and added dropwise into the system through the rubber stopper. Stirring was continued at room temperature for 3 hours after completion of the dropwise addition, and the flask was then heated in an oil bath so that the reaction was continued under reflux. Heating was stopped after 2 hours elapsed since the start of the reflux. After the system returned to normal temperature, 1.00 g of methanol was added to stop the reaction. Subsequently, the reaction solution was concentrated to a solid concentration of 20% by weight, which was then water-washed with an ion-exchanged water in a weight equal to that of the concentrate. Thereafter, the water bath was removed, and the organic layer was added dropwise to methanol (the weight of which was 5 times the weight of the organic layer) under stirring. The precipitate was then filtered and the filtrate was dried under vacuum at 110° C. for 1 hour to obtain a modified polyphenylene ether composition. Table 2 lists the results of the analyses of the resultant modified polyphenylene ether composition.

Example 4

A modified polyphenylene ether composition was obtained by carrying out an operation in the same manner as in Example 3, except that 20 g of the composition obtained in Production Example 2 was used as an unmodified polyphenylene ether composition, and the amount of triethylamine was 7.94 g and the amount of methacryloyl chloride was 4.10 g to obtain. Table 2 lists the results of the analyses of the resultant modified polyphenylene ether composition.

Example 5

A modified polyphenylene ether composition was obtained by carrying out an operation in the same manner as in Example 3, using an unmodified polyphenylene ether composition solution prepared by adding 123.6 g of toluene to 36.4 g of a concentrate obtained by distilling off toluene until the solid content in the unmodified polyphenylene ether composition solution became 55% by mass in Production Example 1. Table 2 lists the results of the analyses of the resultant modified polyphenylene ether composition.

Comparative Example 4

A modified polyphenylene ether composition was obtained by carrying out an operation in the same manner as in Example 3, except that 20 g of the composition obtained in Production Comparative Example 1 was used as an unmodified polyphenylene ether composition, and the amount of triethylamine was 10.79 g and the amount of methacryloyl chloride was 5.57 g. Table 2 lists the results of the analyses of the resultant modified polyphenylene ether composition.

Comparative Example 5

A modified polyphenylene ether composition was obtained by carrying out an operation in the same manner as in Example 3, except that 20 g of the composition obtained in Production Comparative Example 2 was used as an unmodified polyphenylene ether composition, and the amount of triethylamine was 10.94 g and the amount of methacryloyl chloride was 5.65 g. Table 2 lists the results of the analyses of the resultant modified polyphenylene ether composition.

Comparative Example 6

A modified polyphenylene ether composition was obtained by carrying out an operation in the same manner as in Comparative example 3, except that 20 g of the composition obtained in Production Comparative Example 3 was used as an unmodified polyphenylene ether composition, and the amount of triethylamine was 7.86 g and the amount of methacryloyl chloride was 4.06 g. Table 2 lists the results of the analyses of the resultant modified polyphenylene ether composition.

TABLE 2

|  |  | Example 3 | Example 4 | Example 5 | Comp. Example 4 | Comp. Example 5 | Comp. Example 6 |
|---|---|---|---|---|---|---|---|
| Presence ratio of polyphenylene ether | mol % | 92 | 95 | 92 | 75 | 49 | — |
| Presence ratio of peroxide peak | — | 0 | 0 | 0 | 6.7 | 0 | 0 |
| Number average molecular weight | g/mol | 2660 | 2570 | 2660 | 2820 | 2704 | 2490 |
| Tg | ° C. | 171 | 141 | 171 | 133 | 158 | 152 |
| Number of substituents A | mmol/g | 1150 | 780 | 1150 | 670 | 600 | 890 |
| MEK solubility | — | Good | Good | Good | Bad | Bad | Good |
| Liquid viscosity | mPa · s | 26 | 28 | 26 | 27 | 31 | 40 |

As indicated in Table 2, in Examples 3 to 5, the modified polyphenylene ether compositions having a presence ratio of the main component polyphenylene ether of 60 mol % or more and a low presence ratio of the peroxide peak were obtained. Further, it has been found that the modified polyphenylene ether compositions according to Examples 3 to 5 had high Tg of 140° C. or higher, were also excellent in long-term solubility in methyl ethyl ketone, and the toluene solutions thereof had lower liquid viscosities compared to polymers having similar number average molecular weights, so that the workability during application of a substrate material would be excellent.

The polyphenylene ether composition according to Comparative Example 4 exhibited a presence ratio of the main component polyphenylene ether of 60 mol % or more, and the liquid viscosity of the toluene solution thereof was low. However, a lot of peroxide peaks were present, the long-term solubility in methyl ethyl ketone could not be assured, and the Tg was low. Application to a substrate material is therefore considered to be difficult.

The polyphenylene ether composition according to Comparative Example 5 had no peroxide peak and exhibited a high Tg. However, application to a substrate material is considered to be difficult because the presence ratio of the main component polyphenylene ether was low and the long-term solubility in methyl ethyl ketone could not be assured.

Further, the polyphenylene ether composition according to Comparative Example 6 exhibited excellent physical properties regarding the presence ratio of the main component polyphenylene ether, the presence or absence of peroxide peak, the number of the substituent A, Tg, and the long-term solubility in methyl ethyl ketone. However, because the liquid viscosity of the toluene solution relative to the number average molecular weight was high, the workability is considered to be inferior to the examples upon being applied to a substrate material.

INDUSTRIAL APPLICABILITY

The polyphenylene ether composition and/or the modified polyphenylene ether composition of the present disclosure are industrially useful in applications to electronic materials because they have high glass transition temperatures and can improve the process applicability to substrate materials.

The invention claimed is:
1. A polyphenylene ether composition comprising:
60 mol % or more of a polyphenylene ether having a structure of the following Formula (1),
wherein a ratio of an integrated value of a peak appearing at 7.6 to 8.3 ppm to an integrated value of a peak derived from a structure of the following Formula (2) is 1 or less in a $^1$H-NMR measurement result, and a number average molecular weight in terms of polystyrene is 500 to 15000 g/mol,

Formula (1)

(in Formula (1), Z is an a-valent partial structure represented by the following Formula (2), a represents an integer of 2 to 6, Y are each independently a divalent linking group having a structure of the following Formula (4), n represents a repeating number of Y and are each independently an integer of 0 to 200, and at least one n in a (—$Y_n$—H) is an integer of 1 or more,)

Formula (2)

in Formula (2), X is an a-valent alkyl skeleton, $R^5$ are each independently an optional substituent, k are each independently an integer of 1 to 4, and at least one $R^5$ is a partial structure represented by the following Formula (3),

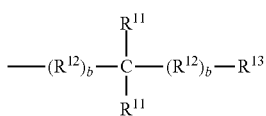

Formula (3)

in Formula (3), $R^{11}$ are each independently an optionally substituted alkyl group having a carbon number of 1 to 8, $R^{12}$ are each independently an optionally substituted alkylene group having a carbon number of 1 to 8, b are each independently 0 or 1, and $R^{13}$ represents one of a hydrogen atom, an optionally substituted alkyl group having a carbon number of 1 to 8, and an optionally substituted phenyl group, when the position of the carbon atom of the benzene ring to which —O— is bonded in Formula (2) is designated as Position 1, $R^5$ having the partial structure of Formula (3) is bonded to one carbon atom at Position 2 or Position 6, and a hydrogen atom, a methyl group, or an ethyl group is bonded to the other carbon atom at Position 2 or Position 6, and

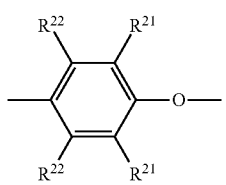

Formula (4)

in Formula (4), $R^{21}$ are each independently one of a hydrogen atom, an optionally substituted hydrocarbon group having a carbon number of 1 to 6, an optionally substituted aryl group having a carbon number of 6 to 12, and a halogen atom, and two $R^{21}$ cannot be both hydrogen atoms, and two $R^{21}$ are not in a combination in which one $R^{21}$ is the partial structure represented by the above Formula (3) and the other $R^{21}$ is one of a hydrogen atom, a methyl group, or an ethyl group, and $R^{22}$ are each independently one of a hydrogen atom, an optionally substituted hydrocarbon group having a carbon number of 1 to 6, an optionally substituted aryl group having a carbon number of 6 to 12, and a halogen atom.

2. The polyphenylene ether composition according to claim 1, wherein the partial structure represented by Formula (3) is a t-butyl group.

3. The polyphenylene ether composition according to claim 1, wherein the number of OH terminals contained in the polyphenylene ether composition is 1000 to 3000 μmol/g.

4. A polyphenylene ether composition comprising:
- 60% mol % or more of a modified polyphenylene ether having a structure of the following Formula (1)',
- a ratio of an integrated value of a peak appearing at 7.6 to 8.3 ppm to an integrated value of a peak derived from the structure of the following Formula (2)' is 1 or less in a $^1$H-NMR measurement result, and
- a number average molecular weight in terms of polystyrene is 500 to 15000 g/mol, $$Z \!-\! [Y_n \!-\! A]_a$$

Formula (1)'

(in Formula (1)', Z is an a-valent partial structure represented by the following Formula (2)', a represents an integer of 2 to 6, A each independently represents a hydrogen atom or a substituent containing a carbon-carbon double bond and/or an epoxy group, not all A are hydrogen atoms, Y are each independently a divalent linking group having a structure of the following Formula (4)', n represents a repeating number of Y and are each independently an integer of 0 to 200, and at least one n in a ($-Y_n$-A) is an integer of 1 or more)

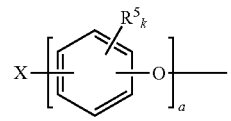

Formula (2)' in Formula (2)', X is an a-valent alkyl skeleton, $R^5$ are each independently an optional substituent, k are each independently an integer of 1 to 4, and at least one $R^5$ is a partial structure represented by the following Formula (3)',

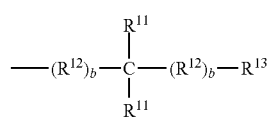

Formula (3)' in Formula (3)', $R^{11}$ are each independently an optionally substituted alkyl group having a carbon number of 1 to 8, $R^{12}$ are each independently an optionally substituted alkylene group having a carbon number of 1 to 8, b are each independently 0 or 1, and $R^{13}$ represents one of a hydrogen atom, an optionally substituted alkyl group having a carbon number of 1 to 8 or an optionally substituted phenyl group, when the position of the carbon atom of the benzene ring to which —O— is bonded in Formula (2)' is designated as Position 1, $R^5$ having the partial structure of Formula (3)' is bonded to one carbon atom at Position 2 or Position 6, and a hydrogen atom, a methyl group, or an ethyl group is bonded to the other carbon atom at Position 2 or Position 6, and

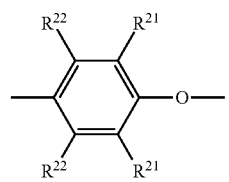

Formula (4)' in Formula (4)', $R^{21}$ are each independently one of a hydrogen atom, an optionally substituted hydrocarbon group having a carbon number of 1 to 6, an optionally substituted aryl group having a carbon number of 6 to 12, and a halogen atom, and two $R^{21}$ cannot be both hydrogen atoms, and two $R^{21}$ are not in a combination in which one $R^{21}$ is the partial structure represented by the above Formula (3)' and the other $R^{21}$ is one of a hydrogen atom, a methyl group, or an ethyl group, and $R^{22}$ are each independently one of a hydrogen atom, an optionally substituted hydrocarbon group having a carbon number of 1 to 6, an optionally substituted aryl group having a carbon number of 6 to 12, and a halogen atom.

5. The polyphenylene ether composition according to claim 4, wherein the partial structure represented by Formula (3)' is a t-butyl group.

6. The polyphenylene ether according to claim 4, wherein A is a group represented by the following Formula (5)',

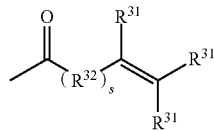

Formula (5)'

(in Formula (5)',
$R^{31}$ are each independently a hydrogen atom, a hydroxy group or a hydrocarbon group having a carbon number of 1 to 30, an aryl group, an alkoxy group, an allyloxy group, an amino group, or a hydroxyalkyl groups,
$R^{32}$ are each independently a hydrocarbon group having a carbon number of 1 to 30, and
s is an integer between 0 and 5.

7. The polyphenylene ether composition according to claim 4, wherein the number of A groups contained in the polyphenylene ether composition is from 700 to 3000 μmol/g.

8. The polyphenylene ether composition according to claim 2, wherein the number of OH terminals contained in the polyphenylene ether composition is 1000 to 3000 μmol/g.

9. The polyphenylene ether according to claim 5, wherein A is a group represented by the following Formula (5)',

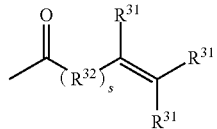

Formula (5)'

(in Formula (5)',
$R^{31}$ are each independently a hydrogen atom, a hydroxy group or a hydrocarbon group having a carbon number of 1 to 30, an aryl group, an alkoxy group, an allyloxy group, an amino group, or a hydroxyalkyl groups,
$R^{32}$ are each independently a hydrocarbon group having a carbon number of 1 to 30, and
s is an integer between 0 and 5.

10. The polyphenylene ether composition according to claim 5, wherein the number of A groups contained in the polyphenylene ether composition is from 700 to 3000 μmol/g.

11. The polyphenylene ether composition according to claim 6, wherein the number of A groups contained in the polyphenylene ether composition is from 700 to 3000 μmol/g.

12. The polyphenylene ether composition according to claim 9, wherein the number of A groups contained in the polyphenylene ether composition is from 700 to 3000 μmol/g.

* * * * *